(12) United States Patent
Kanai et al.

(10) Patent No.: US 8,427,923 B2
(45) Date of Patent: Apr. 23, 2013

(54) OPTICAL PICKUP DEVICE, OPTICAL DISC DEVICE AND FOCUS ADJUSTING METHOD

(75) Inventors: Satoshi Kanai, Mizuho (JP); Kenji Nagatomi, Kaizu (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 329 days.

(21) Appl. No.: 12/844,245

(22) Filed: Jul. 27, 2010

(65) Prior Publication Data

US 2011/0026382 A1 Feb. 3, 2011

(30) Foreign Application Priority Data

Jul. 29, 2009 (JP) ................................. 2009-177046

(51) Int. Cl.
| | |
|---|---|
| G11B 5/09 | (2006.01) |
| G11B 7/00 | (2006.01) |
| G11B 7/135 | (2006.01) |
| G11B 5/58 | (2006.01) |
| G11B 5/55 | (2006.01) |

(52) U.S. Cl.
USPC ................ 369/112.23; 369/47.14; 369/44.28; 369/53.23; 369/53.28; 369/53.27; 369/53.35; 369/124.12; 369/44.41; 369/53.22

(58) Field of Classification Search ............. 369/112.23, 369/47.14, 44.28, 53.23, 53.28, 53.27, 53.35, 369/124.12, 44.41, 53.22
See application file for complete search history.

(56) References Cited

U.S. PATENT DOCUMENTS

| | | | |
|---|---|---|---|
| 2010/0080106 A1* | 4/2010 | Nagatomi et al. | 369/112.26 |
| 2010/0232282 A1* | 9/2010 | Nagatomi et al. | 369/112.03 |
| 2010/0329102 A1* | 12/2010 | Nagatomi | 369/112.23 |

FOREIGN PATENT DOCUMENTS

| | | |
|---|---|---|
| JP | 2006-252716 A | 9/2006 |
| JP | 2006-260669 A | 9/2006 |
| JP | 2007-213754 A | 8/2007 |
| JP | 2008-102998 A | 5/2008 |
| JP | 2008-171470 A | 7/2008 |
| JP | 2009-3986 A | 1/2009 |
| JP | 2009-9630 A | 1/2009 |
| JP | 2009-157978 A | 7/2009 |
| JP | 2009-170060 A | 7/2009 |
| WO | WO2004/040562 A1 | 5/2004 |
| WO | WO2007/105704 A1 | 9/2007 |
| WO | WO2008/007768 A1 | 1/2008 |
| WO | WO 2008/053548 A1 | 5/2008 |
| WO | WO 2008/139686 A1 | 11/2008 |

OTHER PUBLICATIONS

Japanese Office Action for corresponding JP Application No. 2009-177046, dated Nov. 9, 2010, pp. 1-4.
Explanation of Circumstances filed in the corresponding Japanese Application No. 2009-177046, filed Sep. 10, 2010, pp. 1-12, Japan.

* cited by examiner

*Primary Examiner* — Aneeta Yodichkas
(74) *Attorney, Agent, or Firm* — Ditthavong Mori & Steiner, P.C.

(57) ABSTRACT

An optical pickup device includes an astigmatism element which imparts astigmatism to laser light reflected on a disc, a spectral element which changes propagating directions of four light fluxes obtained by dividing a light flux of the laser light reflected on the disc to disperse the four light fluxes from each other, and a photodetector having a sensor group which receives the four light fluxes. The optical pickup device is further provided with a memory which holds a correction value for suppressing a DC component in a tracking error signal resulting from a positional displacement of the spectral element. The tracking error signal is corrected by the correction value to thereby suppress the DC component.

6 Claims, 22 Drawing Sheets

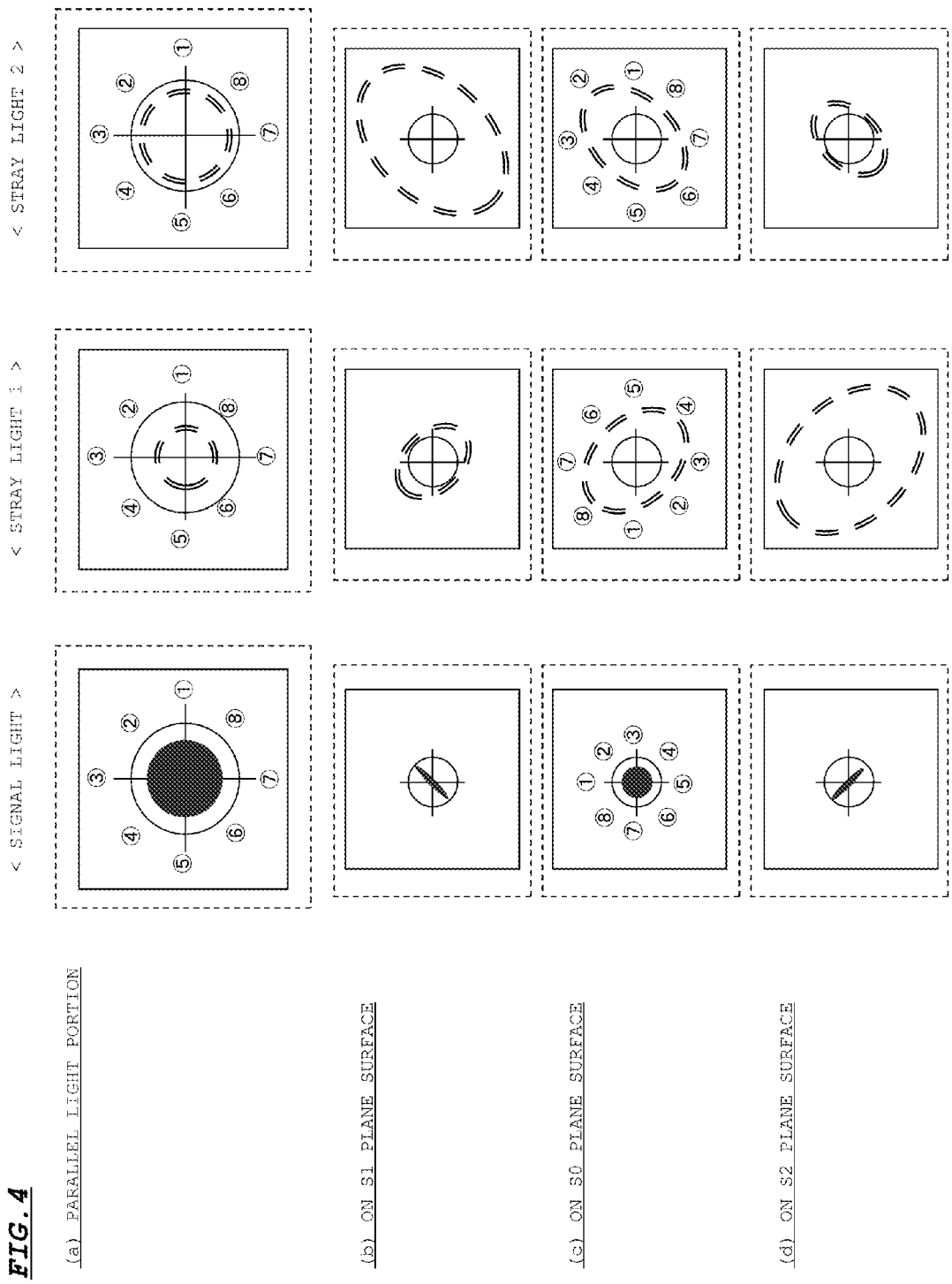

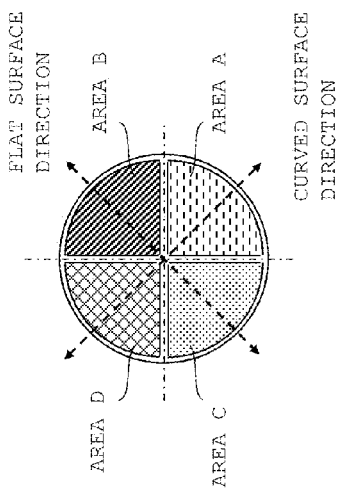
FIG. 5A  LIGHT FLUX DIVIDING PATTERN
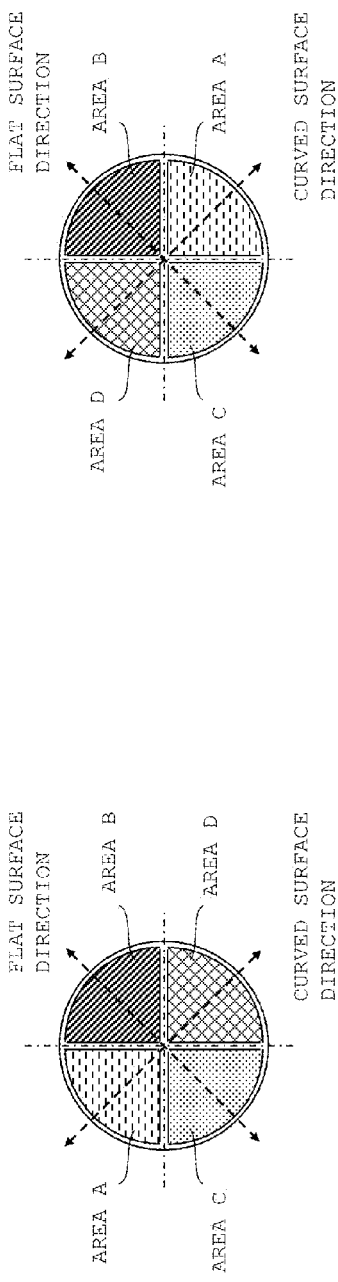
FIG. 5B  SIGNAL LIGHT
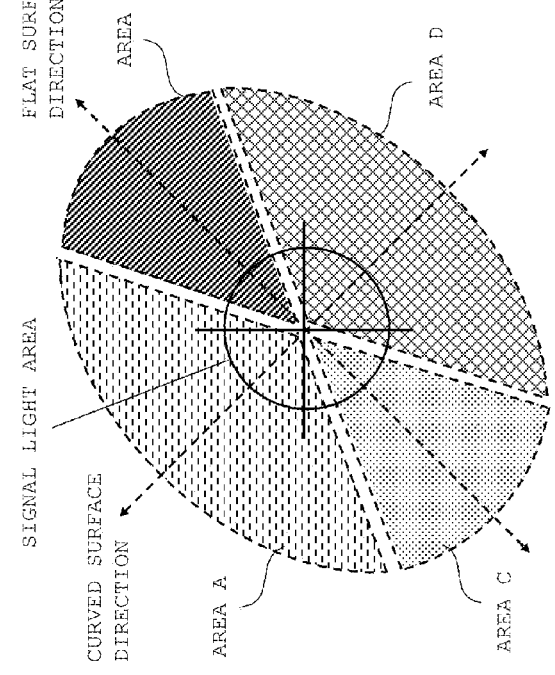
FIG. 5D  STRAY LIGHT 2
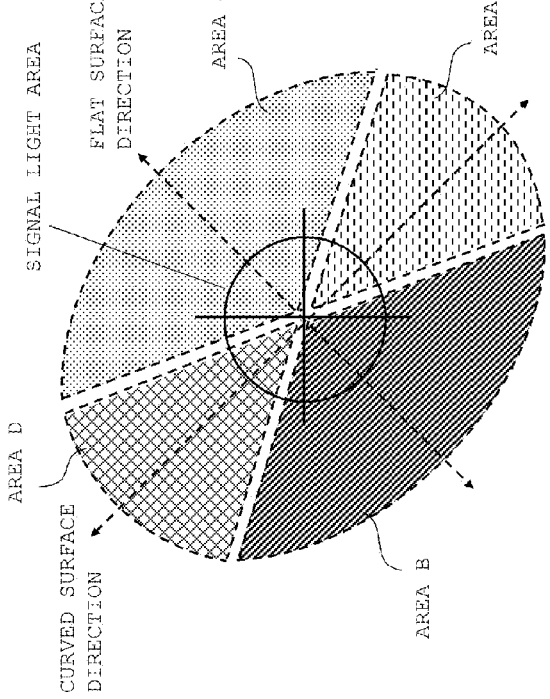
FIG. 5C  STRAY LIGHT 1

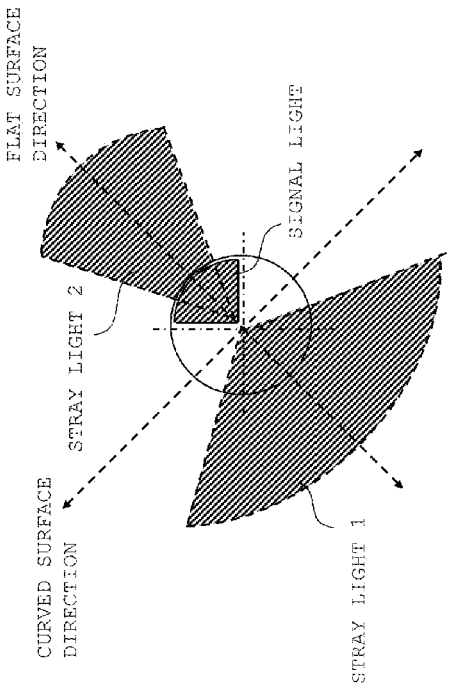
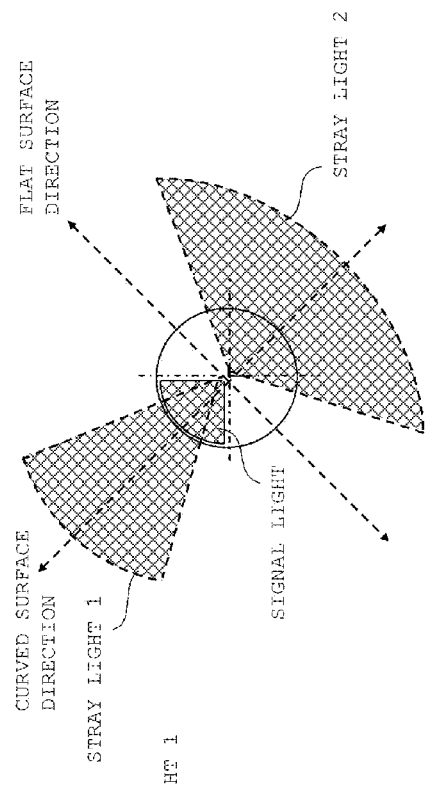
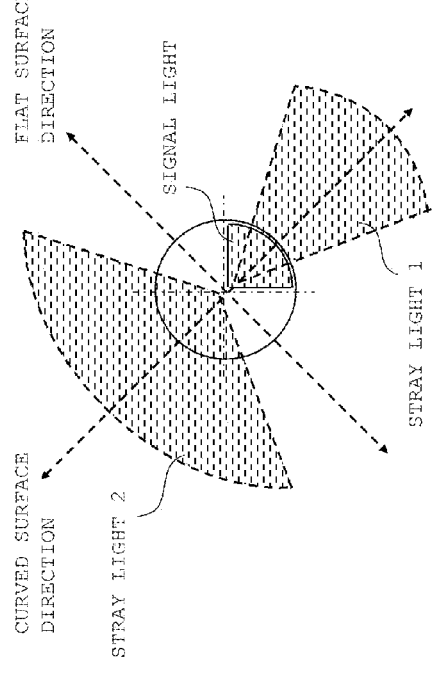
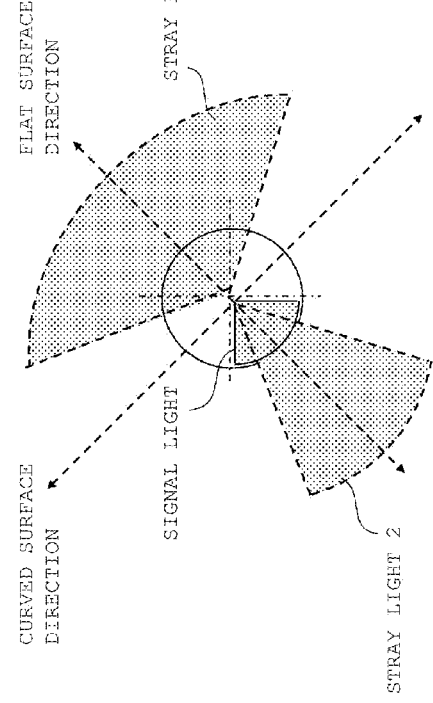

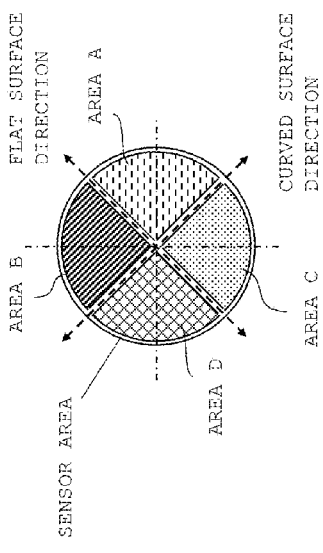
FIG. 7A  LIGHT FLUX DIVIDING PATTERN
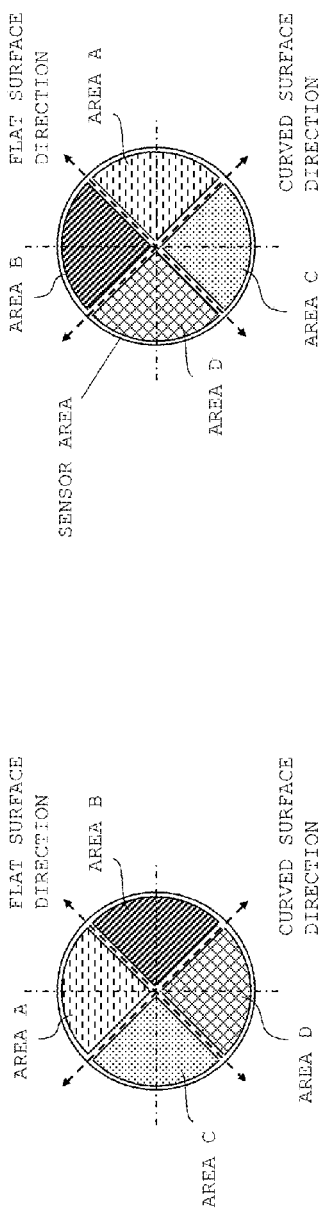
FIG. 7B  SIGNAL LIGHT
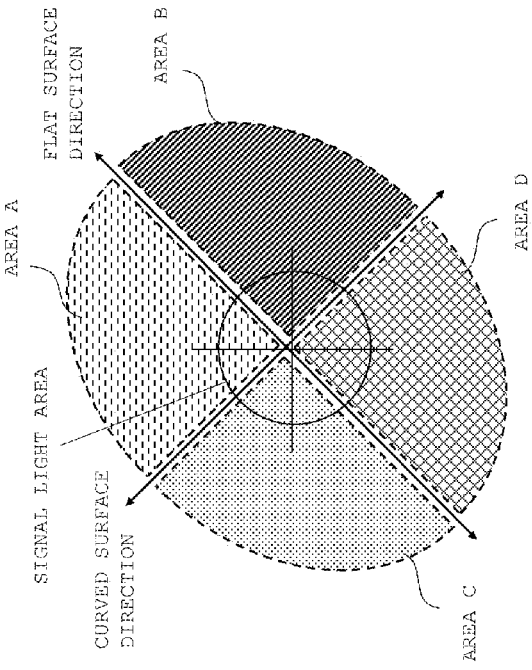
FIG. 7D  STRAY LIGHT 2
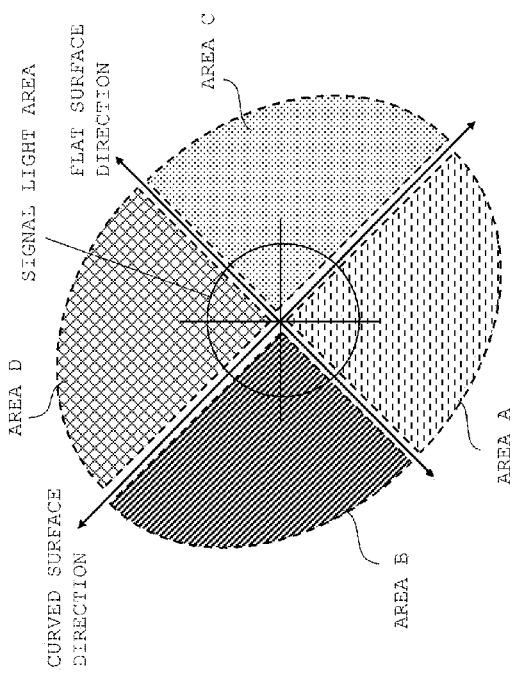
FIG. 7C  STRAY LIGHT 1

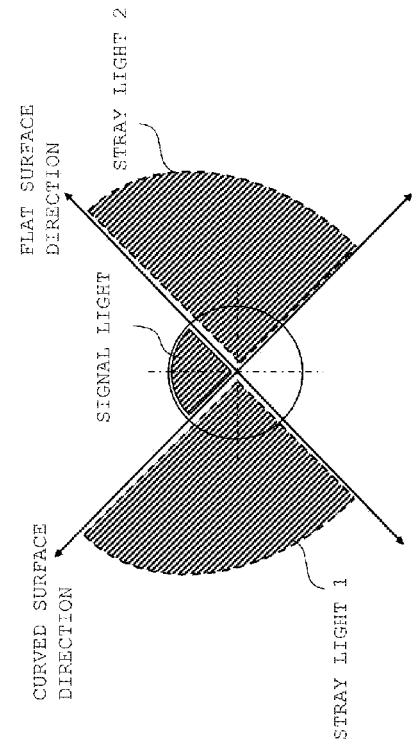
FIG. 8A  LIGHT FLUX STATE IN AREA A
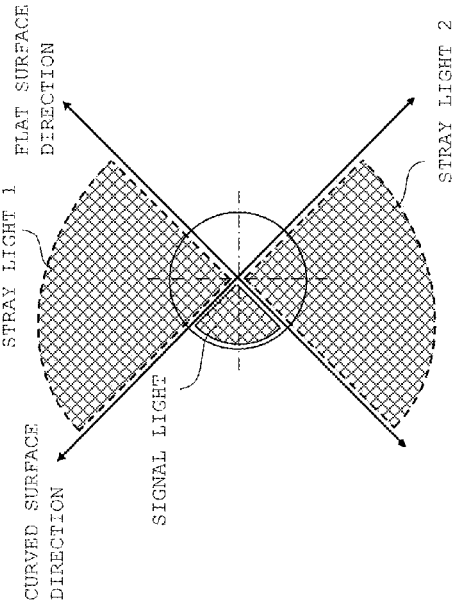
FIG. 8B  LIGHT FLUX STATE IN AREA B
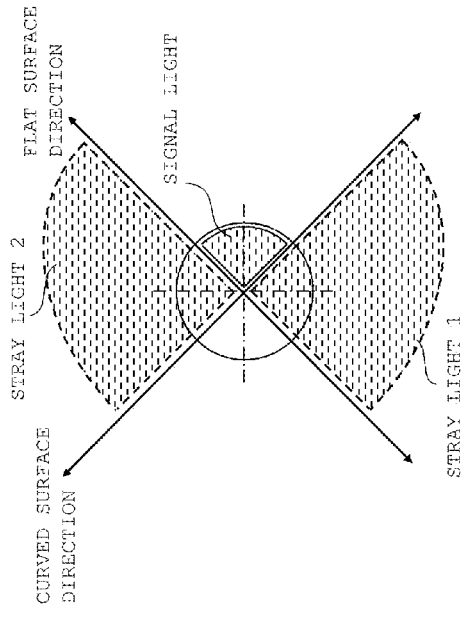
FIG. 8C  LIGHT FLUX STATE IN AREA C
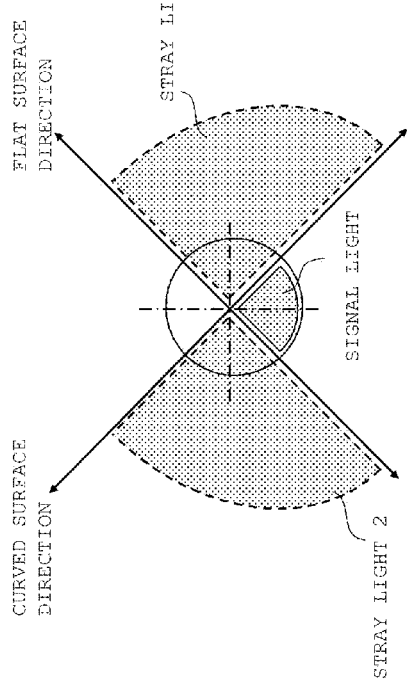
FIG. 8D  LIGHT FLUX STATE IN AREA D

LIGHT FLUX ON PLANE S0

PROVIDE ANGLAR CHANGE TO EACH AREA

FE = (A+B+E+F) - (C+D+G+H)
PP = (A+B+G+H) - (C+D+E+F)

FE = (A+B+E+F) - (C+D+G+H)
PP = (A+B+G+H) - (C+D+E+F)

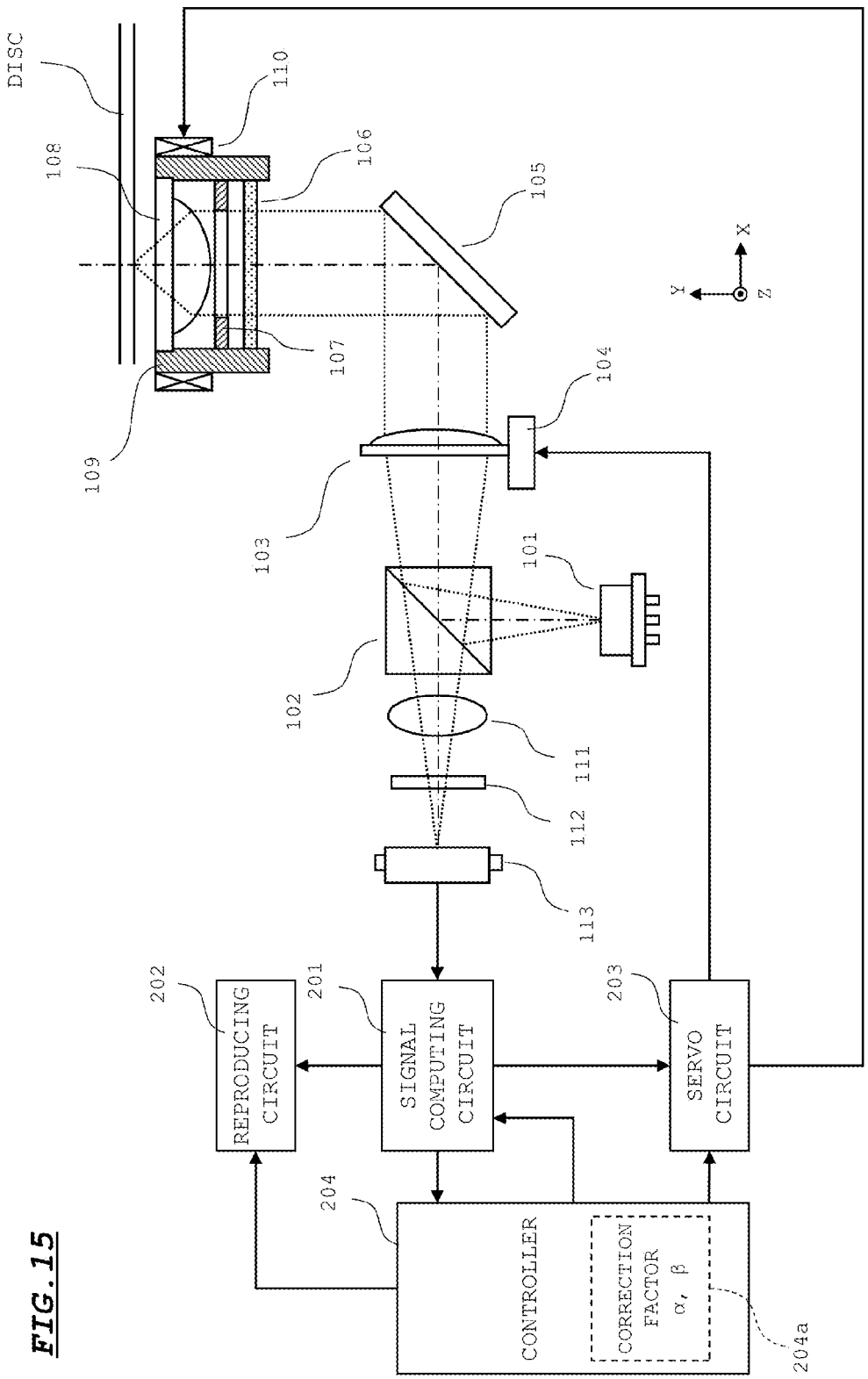

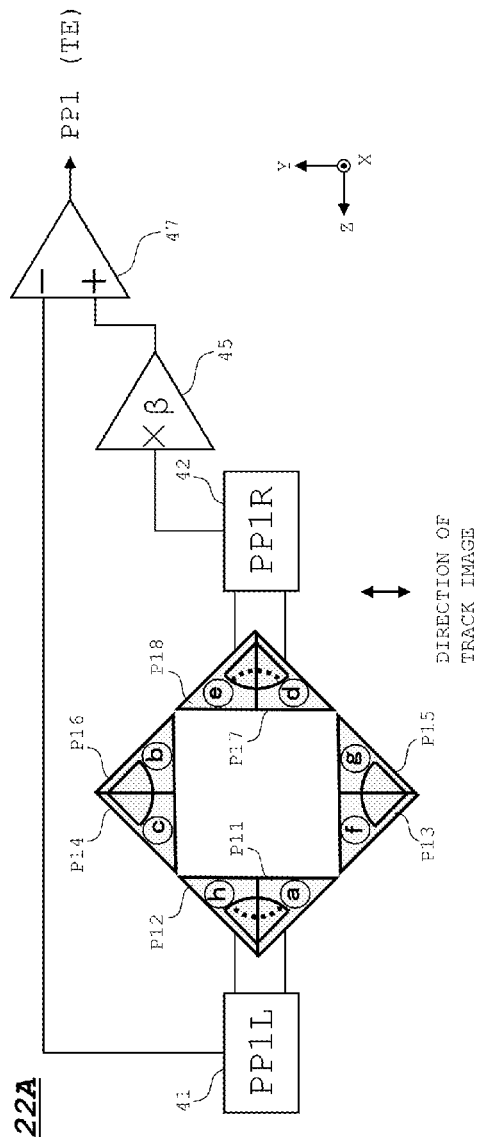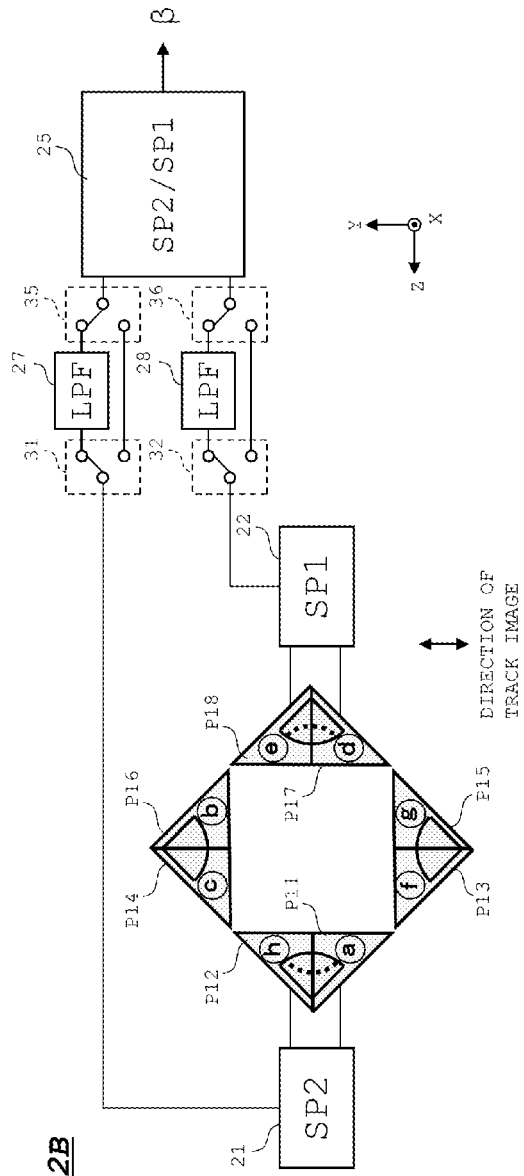

OPTICAL PICKUP DEVICE, OPTICAL DISC DEVICE AND FOCUS ADJUSTING METHOD

This application claims priority under 35 U.S.C. Section 119 of Japanese Patent Application No. 2009-177046 filed Jul. 29, 2009, entitled "OPTICAL PICKUP DEVICE, OPTICAL DISC DEVICE AND FOCUS ADJUSTING METHOD". The disclosure of the above applications is incorporated herein by reference.

BACKGROUND OF THE INVENTION

1. Field of the Invention

The present invention relates to an optical pickup device, an optical disc device, and a focus adjusting method and more particularly to a technology adapted to record/reproduce with respect to a recording medium having laminated recording layers.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

In an optical pickup device or an optical disc device, a tracking error signal is generated based on non-uniformity of a light amount distribution of laser light reflected on a disc. A DC component may be superimposed on the tracking error signal, resulting from a positional displacement of an optical element disposed in the device with respect to an optical axis of laser light. It is desirable to suppress the DC component at a predetermined timing such as at the time of installation of an optical system or at the time of aging deterioration.

SUMMARY OF THE INVENTION

A first aspect of the invention is directed to an optical pickup device. The optical pickup device according to the first aspect includes: a laser light source; an objective lens which converges laser light emitted from the laser light source on a disc; an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light; a spectral element which changes propagating directions of four light fluxes obtained by dividing a light flux of the laser light reflected on the disc by a first straight line and a second straight line respectively in parallel to the first direction and the second direction to disperse the four light fluxes from each other; a photodetector including a sensor group which receives the four light fluxes dispersed by the spectral element; and a memory which holds a correction value for suppressing a DC component in a tracking error signal resulting from a positional displacement of the spectral element with respect to an optical axis of the laser light. In this arrangement, the correction value is set, based on a balance between a first signal and a second signal, out of signals to be outputted from the sensor group, each of the first signal and the second signal being a subtraction result obtained in a process of generating the tracking error signal. For instance, the correction value is set, based on a balance between the first signal and the second signal obtained by converging the laser light on a flat reflection surface devoid of a track.

A second aspect of the invention is directed to an optical disc device. The optical disc device includes an optical pickup device, a computing circuit which computes a signal to be outputted from the optical pickup device, and a memory which holds a control parameter. In this arrangement, the optical pickup device includes a laser light source; an objective lens which converges laser light emitted from the laser light source on a disc; an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light; a spectral element which changes propagating directions of four light fluxes obtained by dividing a light flux of the laser light reflected on the disc by a first straight line and a second straight line respectively in parallel to the first direction and the second direction to disperse the four light fluxes from each other; and a photodetector which receives the four light fluxes dispersed by the spectral element. Further, the memory holds a correction value for suppressing a DC component in a tracking error signal resulting from a positional displacement of the spectral element with respect to an optical axis of the laser light. Furthermore, the computing circuit includes a computing section which generates the tracking error signal based on an output from the photodetector, and a correcting section which corrects an output from the computing section based on the correction value.

A third aspect of the invention is directed to a focus adjusting method for controlling a focal point of irradiated light to follow a track on a target surface. The focus adjusting method according to the third aspect includes: imparting astigmatism to the irradiated light reflected on the target surface to set a first focal line position to be defined by convergence of the irradiated light in a first direction, and a second focal line position to be defined by convergence of the irradiated light in a second direction perpendicular to the first direction away from each other in a propagating direction of the irradiated light; and changing propagating directions of four light fluxes obtained by dividing a light flux of the irradiated light reflected on the target surface by a first straight line and a second straight line respectively in parallel to the first direction and the second direction to disperse the four light fluxes from each other. The focus adjusting method further includes generating a focus error signal by an astigmatism method based on a light amount balance between the four light fluxes to adjust a position of the focal point in an optical axis direction of the irradiated light based on the generated focus error signal; and generating a push-pull signal based on a light amount balance of the irradiated light reflected on the target surface in a direction perpendicular to a diffraction image of the track to adjust a position of the focal point in a direction of the irradiated light crossing the track, based on the generated push-pull signal. In this arrangement, a correction value for suppressing a DC component in the push-pull signal is obtained, based on a light amount balance in a direction perpendicular to the diffraction image, the light amount balance being obtained by converging the irradiated light on a flat reflection surface devoid of formation of the track, before the position of the focal point is adjusted in the direction crossing the track. Then, the push-pull signal is corrected based on the obtained correction value, and the position of the focal point in the direction crossing the track is adjusted, based on the corrected push-pull signal.

BRIEF DESCRIPTION OF THE DRAWINGS

These and other objects, and novel features of the present invention will become more apparent upon reading the following detailed description of the embodiment along with the accompanying drawings.

FIG. 4 is a diagram for describing the technical principle (as to how light rays propagate) in the embodiment.

FIGS. 5A through 5D are diagrams for describing the technical principle (an area dividing pattern and a light flux distribution) in the embodiment.

FIGS. 6A through 6D are diagrams for describing the technical principle (an area dividing pattern and a light flux distribution) in the embodiment.

FIGS. 7A through 7D are diagrams for describing the technical principle (an area dividing pattern and a light flux distribution) in the embodiment.

FIGS. 8A through 8D are diagrams for describing the technical principle (an area dividing pattern and a light flux distribution) in the embodiment.

FIG. 15 is a diagram showing arrangements of an optical system in an optical pickup device, and an optical disc device in an inventive example.

FIGS. 22A and 22B are diagrams showing configurations of a computation processor as a modification example.

Figure 1B:
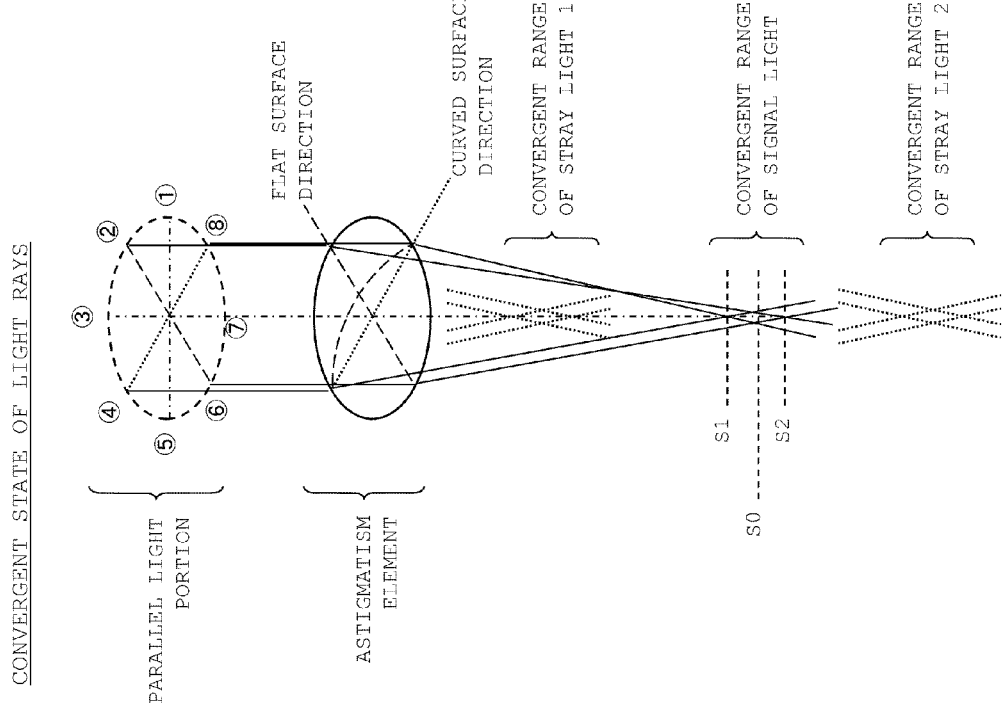
FIGS. 1A and 1B are diagrams for describing a technical principle (as to how light rays propagate) in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 10D.

Figure 1A:
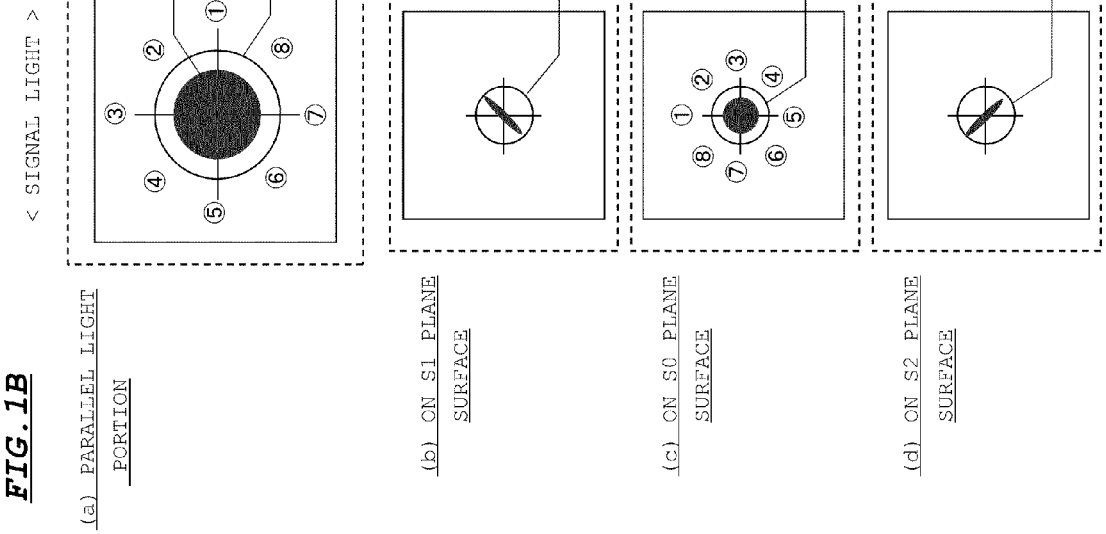

FIG. 1A is a diagram showing a convergent state of signal light and stray light, in the case where laser light (signal light) reflected on a targeted recording layer is entered into an astigmatism element such as an anamorphic lens as parallel light. "Stray light 1" is laser light reflected on a recording layer adjacent to the targeted recording layer at a rearward position of the target recording layer with respect to the laser light incident side, and "stray light 2" is laser light reflected on a recording layer adjacent to the targeted recording layer at a forward position of the targeted recording layer with respect to the laser light incident side. FIG. 1A shows a state that signal light is focused on the targeted recording layer.

As shown in FIG. 1A, a focal line is defined on a plane S1 by convergence of signal light in a "curved surface direction" in FIG. 1A, and a focal line is defined on a plane S2 by convergence of signal light in a "flat surface direction" perpendicular to the curved surface direction, by the function of the anamorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0. In this example, to simplify the description on the astigmatism function by the anamorphic lens, the terms "curved surface direction" and "flat surface direction" are used. Actually, however, as far as the anamorphic lens has a function of defining focal lines at different positions from each other, the anamorphic lens may have a curvature in the "flat surface direction" shown in FIG. 1A. In the case where laser light is entered into the anamorphic lens in a convergence state, the shape of the anamorphic lens in the "flat surface direction" may be linear (curvature radius=∞).

As shown in FIG. 1A, the focal line position of stray light 1 (in FIG. 1A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

The sections (a) through (d) in FIG. 1B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 1A and the section (a) in FIG. 1B, in the case where eight positions (positions 1 through 8: in FIGS. 1A and 1B, the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 1B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 1B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 1B on the plane S0.

Figure 2B:
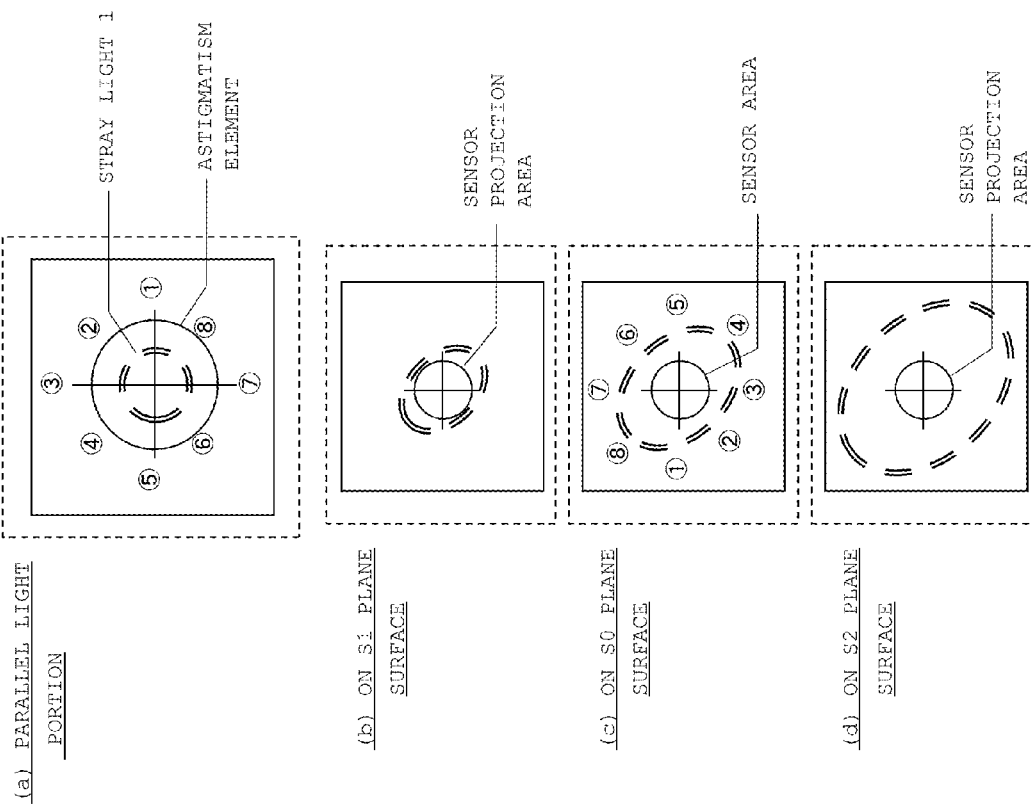
FIGS. 2A and 2B are diagrams for describing the technical principle (as to how light rays propagate) in the embodiment.
Figure 2A:
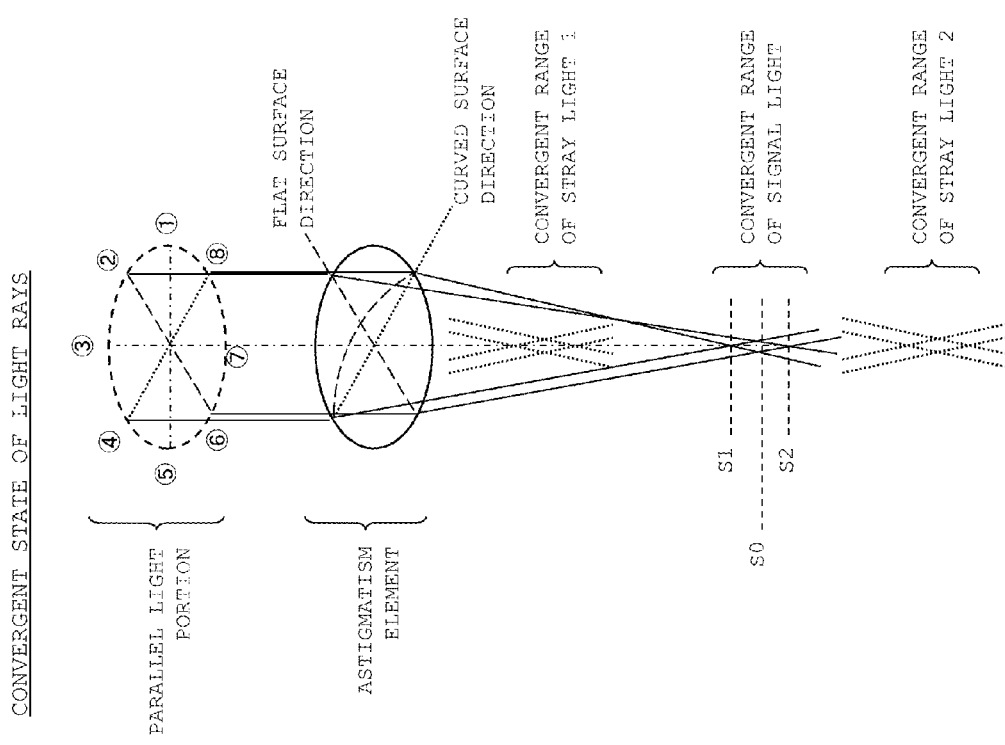

Sections (a) through (d) in FIG. 2B are diagrams respectively showing beam configurations and light ray passing positions of stray light 1 on the parallel light portion, and the planes S1, S0, and S2. As shown in the section (a) of FIG. 2B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 2B on the plane S0.

Figure 3A:
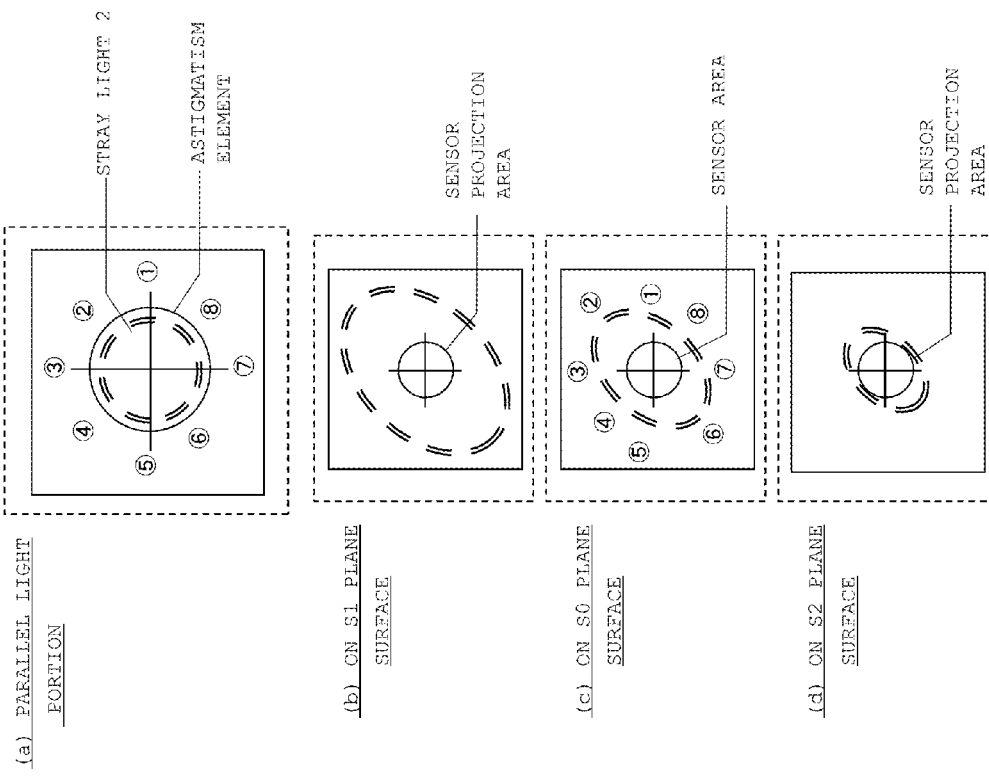
FIGS. 3A and 3B are diagrams for describing the technical principle (as to how light rays propagate) in the embodiment.
Figure 3B:
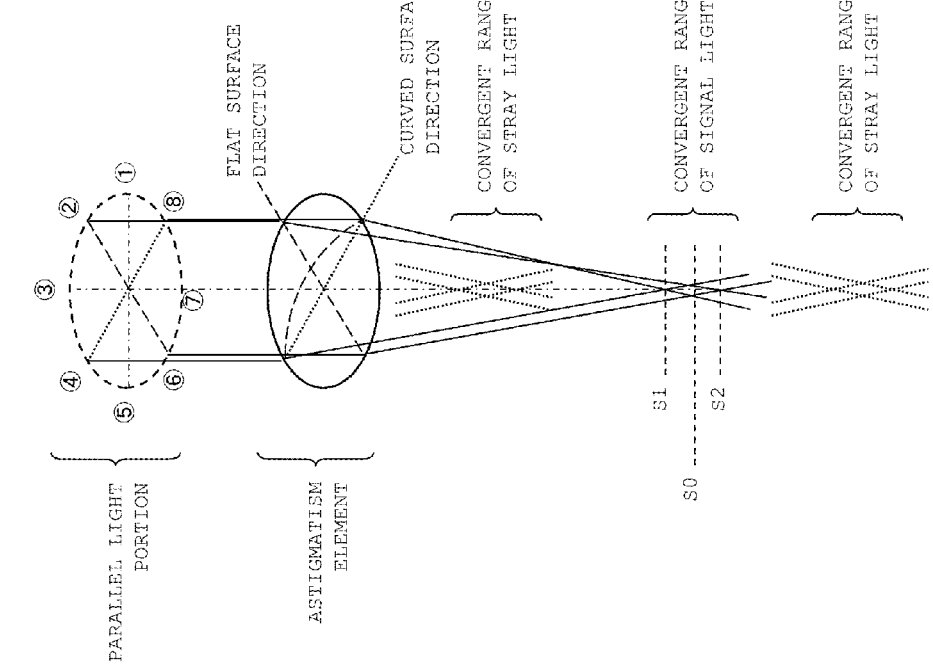

Sections (a) through (d) in FIG. 3B are diagrams respectively showing beam configurations and light ray passing positions of stray light 2 on the parallel light portion, and the planes S1, S0, and S2. As shown in the section (a) of FIG. 3B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 3B on the plane S0.

FIG. 4 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 4, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 5A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 5B due to the above phenomenon. Stray light 1 and stray light 2 in the light flux areas A through D respectively have distributions on the plane S0 as shown in FIGS. 5C and 5D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 6A through 6D. In this case, the signal light in each of the light flux areas is necessarily superimposed on one of the stray light 1 and the stray light 2 in the corresponding same light flux area. Accordingly, if the signal light in each of the light flux areas is received by a sensing portion on the photodetector, at least the stray light 1 or the stray light 2 in the corresponding light flux area is simultaneously entered into the corresponding sensing portion, which may deteriorate a detection signal.

In contrast, as shown in FIG. 7A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 7B due to the above phenomenon. Stray light 1 and stray light 2 in the light flux areas A through D respectively have distributions on the plane S0, as shown in FIGS. 7C and 7D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 8A through 8D. In this case, the signal light in each of the light flux areas is not superimposed with any one of the stray light 1 and the stray light 2 in the corresponding light flux area. Accordingly, if only the signal light is allowed to be received by a sensing portion, after the light fluxes (of signal light, stray light 1, and stray light 2) in each of the light flux areas are dispersed in different directions from each other, only the signal light is allowed to be entered into the corresponding sensing portion to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

Figure 9B:
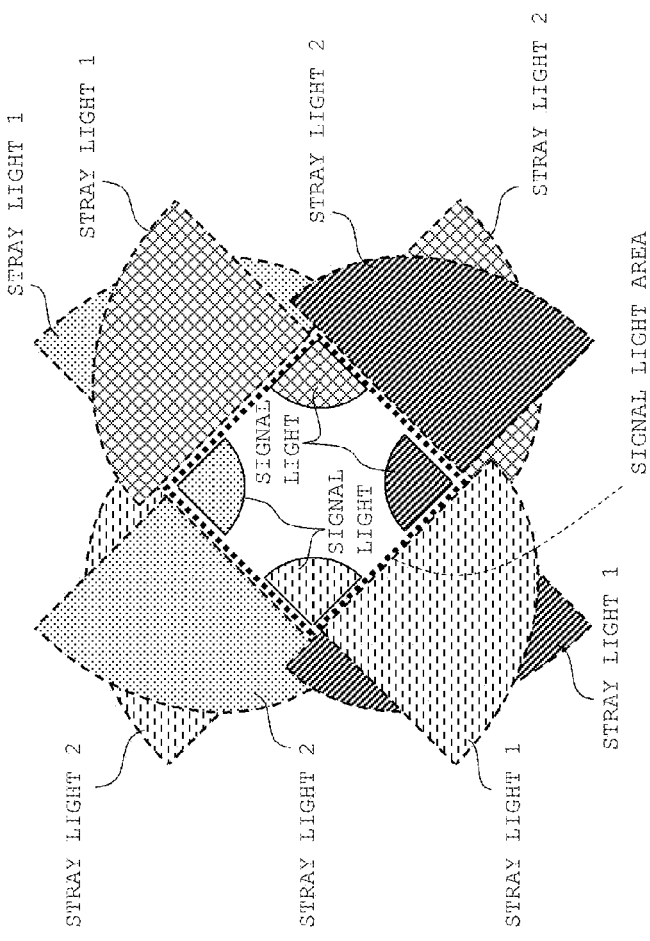
FIGS. 9A and 9B are diagrams for describing the technical principle (an angle changing function and a light flux distribution) in the embodiment.
Figure 9A:
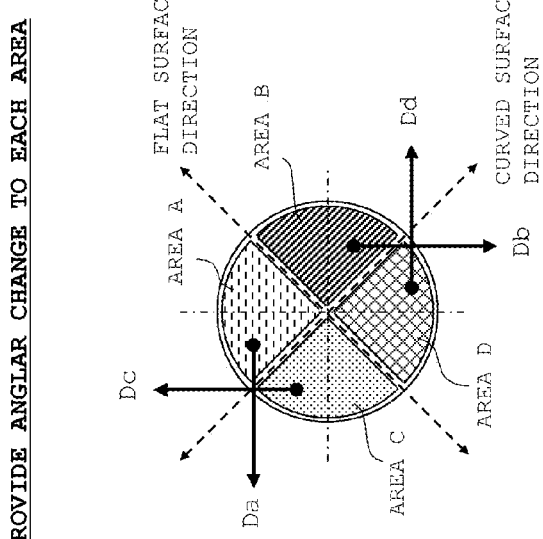

FIGS. 9A and 9B are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 7A are changed from each other by a predetermined angle. In this example, as shown in FIG. 9A, the propagating directions of light fluxes (of signal light, stray light 1, and stray light 2) passing the four light flux areas A through D are respectively changed into directions Da, Db, Dc, and Dd by a predetermined angle amount a (not shown). The directions Da, Db, Dc, and Dd are inclined with respect to each of the flat surface direction and the curved surface direction by 45 degrees.

In this example, adjusting the angle amount a with respect to the directions Da, Db, Dc, and Dd enables to distribute the signal light, the stray light 1, and the stray light 2 in each of the light flux areas on the plane S0, as shown in FIG. 9B. As a result, as shown in FIG. 9B, a signal light area where only the signal light exists can be defined on the plane S0. Setting a sensing portion of the photodetector on the signal light area allows only the signal light in each of the light flux areas to be received on the corresponding sensing portion.

Figure 10A:
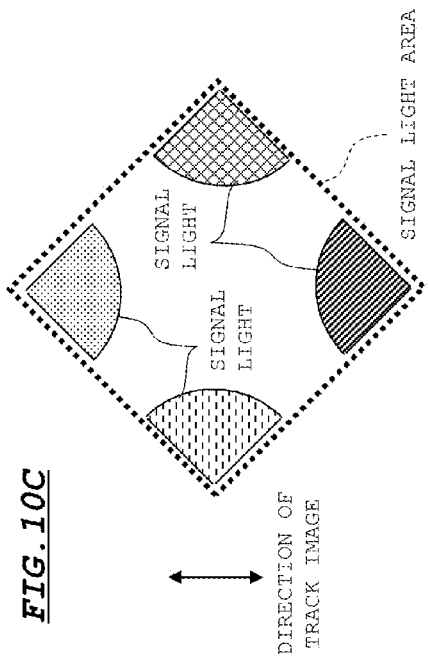
FIGS. 10A through 10D are diagrams showing a method for arranging a sensing portion in the embodiment.
Figure 10C:
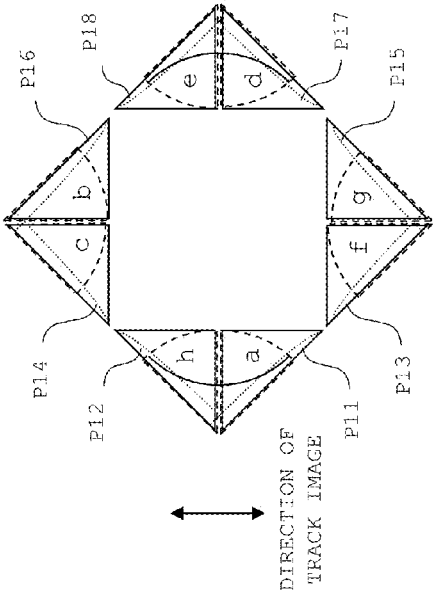
Figure 10B:
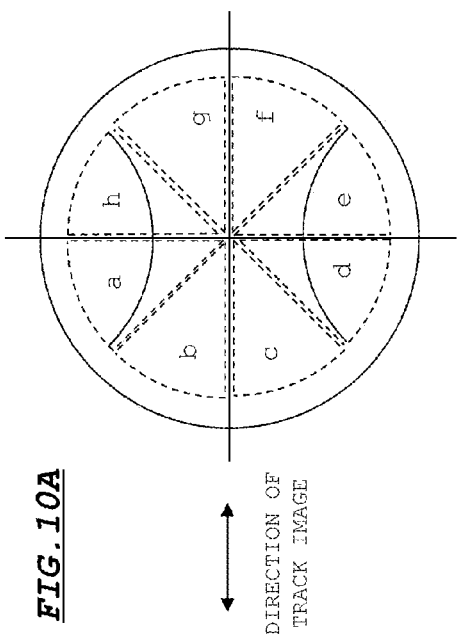
Figure 10D:
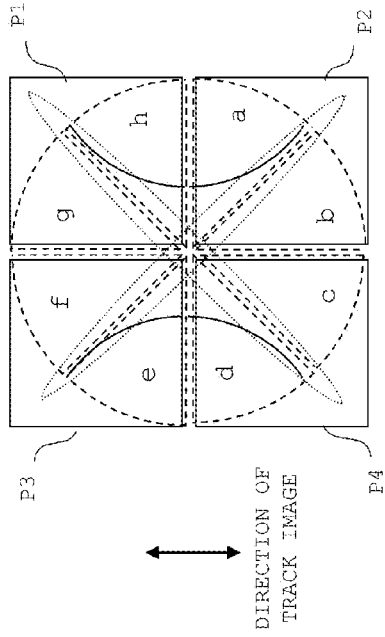

FIGS. 10A through 10D are diagrams for describing a method for arranging a sensing portion. FIGS. 10A and 10B are diagrams showing a light flux dividing method and a sensing portion based on a conventional astigmatism method. FIGS. 10C and 10D are diagrams showing a light flux dividing method and a sensing portion based on the above principle. In this example, a track direction is inclined with respect to each of the flat surface direction and the curved surface direction by 45 degrees. To simplify the description, a light flux is divided into eight light flux areas "a" through "h" in FIGS. 10A and 10B. Diffraction images (track images) by a track groove are indicated by the solid lines, and beam configurations in an out-of-focus state are indicated by the dotted lines in FIGS. 10A and 10B.

It is known that a superimposed state of a zero-th order diffraction image and a first order diffraction image of signal light resulting from a track groove is obtained by (track pitch×NA of objective lens). As shown in FIGS. 10A, 10B, and 10D, a condition for forming a first order diffraction image within the four light flux areas "a", "d", "e", and "h" is expressed by: wavelength/(track pitch×NA of objective lens)>√2.

In the conventional astigmatism method, sensing portions P1 through P4 (a four-division sensor) of a photodetector are set as shown in FIG. 10B. In this arrangement, assuming that detection signal components based on the light intensities of the light flux areas "a" through "h" are expressed by A through H, a focus error signal FE and a push-pull signal PP are obtained by the equations (1) and (2).

$$FE=(A+B+E+F)-(C+D+G+H) \qquad (1)$$

$$PP=(A+B+G+H)-(C+D+E+F) \qquad (2)$$

On the other hand, in the distribution state shown in FIG. 9B, as described above, signal light is distributed in the state as shown in FIG. 10C within the signal light area. In this case, the signal light passing the light flux areas "a" through "h" in FIG. 10A is as shown in FIG. 10D. Specifically, the signal light passing the light flux areas "a" through "h" in FIG. 10A is guided to the light flux areas "a" through "h" shown in FIG. 10D on the plane S0 where the sensing portion of the photodetector is disposed.

Accordingly, setting the sensing portions P11 through P18 at the positions of the light flux areas "a" through "h" shown in FIG. 10D in the superimposed state shown in FIG. 10D enables to generate a focus error signal and a push-pull signal by performing the same computation as applied in FIG. 10B. Specifically, assuming that detection signals from the sensing portions which receive light fluxes in the light flux areas "a" through "h" are expressed by A through H, similarly to the arrangement shown in FIG. 10B, a focus error signal FE and a push-pull signal PP can be obtained by performing computation in accordance with the equation (1) and (2).

As described above, according to the above principle, dividing each of the signal light, the stray light 1, and the stray light 2 on the parallel light portion into four light flux areas A through D by two straight lines, which are respectively in parallel to the flat surface direction and the curved surface direction shown in FIG. 1A; dispersing the light passing the light flux areas A through D; and allowing the signal light in each of the light flux areas A through D after dispersion to be individually received by two sensing portions enable to generate a focus error signal and a push-pull signal (a tracking error signal) by performing the same computation as applied to the process based on the conventional astigmatism method.

In an actual optical system, an angle adjuster for changing propagating directions of light fluxes passing the respective light flux areas is used to make a distribution state of light fluxes (signal light, stray light 1, and stray light 2) passing the light flux areas A through D shown in FIG. 9A coincident with the distribution state shown in FIG. 9B on the plane S0. However, if the position of the angle adjuster is displaced in a direction perpendicular to the direction of a track image of reflection light on a disc, there occurs a problem that a DC component resulting from a positional displacement of the angle adjuster may be superimposed on a push-pull signal (a tracking error signal) generated by the equation (2).

Figure 11B:
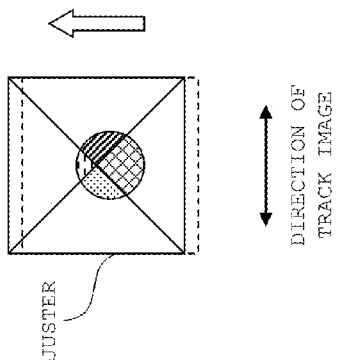
FIGS. 11A through 11D are diagrams for describing how a DC component is superimposed on a push-pull signal resulting from a positional displacement of an angle adjuster.
Figure 11D:
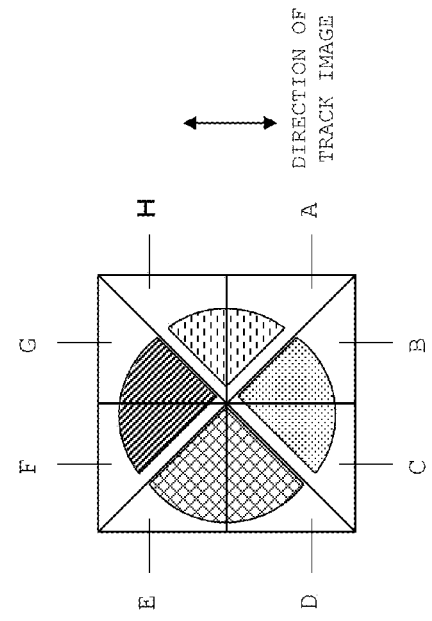
Figure 11A:
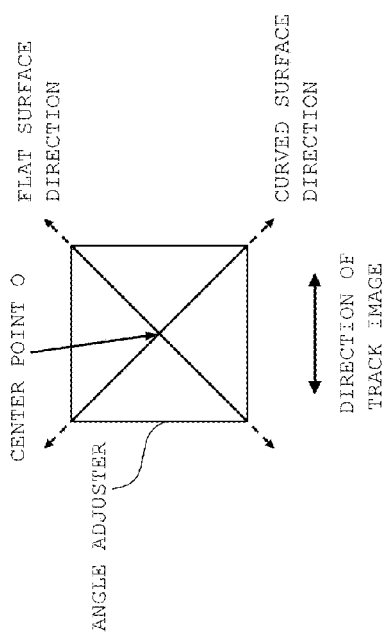
Figure 11C:
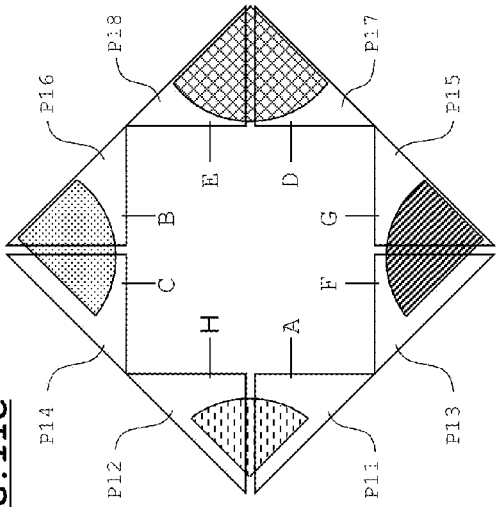

FIGS. 11A through 11C are diagrams for describing how a DC component is superimposed on a push-pull signal (a tracking error signal) resulting from a positional displacement of the angle adjuster. FIGS. 11A and 11B are diagrams of the angle adjuster, when viewed in a propagating direction of reflection light on a disc. FIG. 11C is a diagram showing sensing portions P11 through P18 shown in FIG. 10D. FIG. 11D is a diagram, wherein the distribution of signal light to be entered into the sensing portions shown in FIG. 11C is changed.

As shown in FIG. 11A, the angle adjuster has four different areas i.e. an upper area, a right area, a left area, and a lower area on a laser light incident surface thereof. The four areas respectively have a function of separating laser light passing the four light flux areas A through D shown in FIG. 9A from each other, and making a distribution state of laser light passing the respective light flux areas, as shown in FIG. 9B, on a light detection surface. In this case, the optical axis of reflection light on a disc is adjusted to pass a point (a center point O) at which the four different areas of the angle adjuster intersect with each other.

However, as shown in FIG. 11B, if the position of the angle adjuster is displaced in a direction (upward direction in FIG. 11B) perpendicular to the direction of a track image of reflection light on a disc, signal light passing the light flux areas A through D is irradiated onto the sensing portions P11 through P18, as shown in FIG. 11C. If the distribution of signal light to be entered into the sensing portions shown in FIG. 11C is changed to such a state that the vertexes of the sensing portions face each other, as shown in FIG. 11D, the signal light distribution is transversely asymmetrical with respect to a centerline for dividing the light detection surface into left and right two portions. In other words, signal light to be entered into the sensing portions P11 through P18 is deviated in a direction perpendicular to the direction of a track image resulting from a positional displacement of the angle adjuster. As a result, a DC component may be superimposed on a push-pull signal (a tracking error signal) obtained by the equation (2).

Also, in the case where the position of the angle adjuster is displaced in a direction parallel to the direction of a track image of reflection light on a disc, signal light to be entered into the sensing portions P11 through P18 is deviated. However, in this case, since the deviation direction of signal light is in parallel to the direction of a track image, there is no likelihood that a DC component may be superimposed on a push-pull signal (a tracking error signal) obtained by the equation (2).

As described above, a DC component resulting from a positional displacement of the angle adjuster in a direction perpendicular to the direction of a track image of reflection light on a disc can be effectively suppressed by correcting a push-pull signal (a tracking error signal) with respect to the sensing portions shown in FIG. 10D as follows.

In the following, there is described a technique of generating a push-pull signal (a tracking error signal) capable of effectively suppressing a DC component, along with simulation results obtained by the inventors of the present application.

Figure 12A:
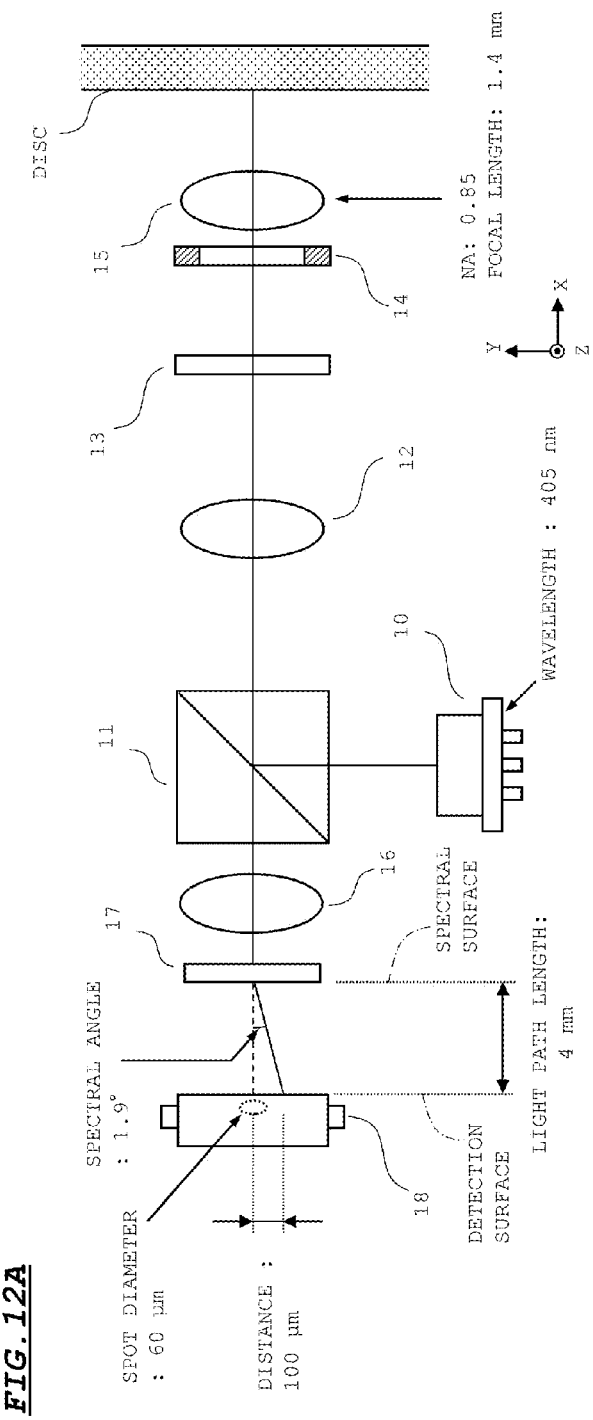
FIGS. 12A through 12C are diagrams showing an optical system to be used in simulating a DC component in a push-pull signal.

FIG. 12A is a diagram showing an optical system used in the simulation. In FIG. 12A, the reference numeral 10 denotes a semiconductor laser for emitting laser light of 405 nm wavelength, 11 denotes a polarized beam splitter for substantially totally reflecting laser light emitted from the semiconductor laser 10, 12 denotes a collimator lens for converting laser light into parallel light, 13 denotes a quarter wavelength plate for converting laser light (linearly polarized light) to be entered from the side of the collimator lens 12 into circularly polarized light, 14 denotes an aperture for adjusting the beam shape of laser light into a true circle having a center aligned with the optical axis of laser light, 15 denotes an objective lens for converging laser light on a disc, 16 denotes a detection lens for imparting astigmatism to reflection light on a disc through the polarized beam splitter 11, 17 denotes an angle adjuster for imparting the function described referring to FIG. 9A to laser light, and 18 denotes a photodetector.

The design condition of the optical system is as follows:
(1) magnification of outward path: 10 times
(2) magnification of return path: 20 times
(3) spectral angle to be imparted by the angle adjuster 17: 1.9°
(4) distance (in air) between spectral surface of the angle adjuster 17 and detection surface of the photodetector 18: 4 mm
(5) spot diameter on light detection surface, excluding the angle adjuster 17: 60 μm
(6) displacement distance of respective signal light (passing the light flux areas A through D) on light detection surface, including the angle adjuster 17: 100 μm
(7) divergence angle of laser light:
divergence angle in vertical direction=20.0°,
divergence angle in horizontal direction=9.0°
(8) effective lens diameter: ϕ=2.4 mm
(9) numerical aperture of objective lens: 0.85
(10) focal length of objective lens: 1.4 mm
(11) track pitch of disc: 0.32 μm The magnification (1) of the outward path corresponds to a ratio of the focal length of the collimator lens with respect to the focal length of the objective lens. The magnification (2) of the return path corresponds to a ratio of the composite focal length of the collimator lens and the detection lens with respect to the focal length of the objective lens. In the optical system of the embodiment, laser light (signal light) reflected on a disc becomes a least circle of confusion on the detection surface, in the case where the angle adjuster 17 is not provided. The spot diameter (5) corresponds to the diameter of the least circle of confusion.

Figure 12B:
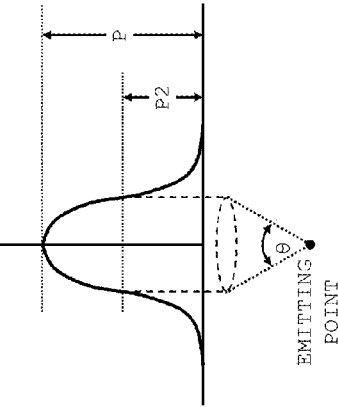

The displacement distance (6) corresponds to a distance between the center of the optical axis of signal light on the detection surface in the case where the angle adjuster 17 is not provided, and the position of a vertex (the position of a vertex corresponding to a right angle portion of the fan-shaped signal light shown in FIGS. 8A through 8D) of each of the signal light in the case where the angle adjuster 17 is provided. The dimensional condition of a sensing portions is as shown in FIG. 12B.

Figure 12C:
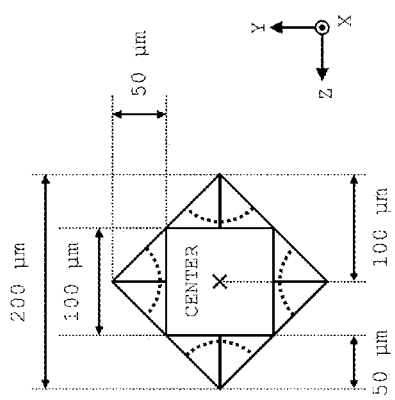

The divergence angle (7) in vertical direction corresponds to a divergence angle of laser light in the interlayer direction of a semiconductor layer of a laser element incorporated in the optical pickup device 10, and the divergence angle (7) in horizontal direction corresponds to a divergence angle of laser light in a direction parallel to the semiconductor layer. In this embodiment, as shown in FIG. 12C, the divergence angle is set to a divergence angle of a beam portion having an intensity equal to or larger than one-half of the peak intensity P. The effective lens diameter (8) corresponds to the diameter of a beam at the time of incidence into the objective lens 15 through the aperture 14.

Figure 13:
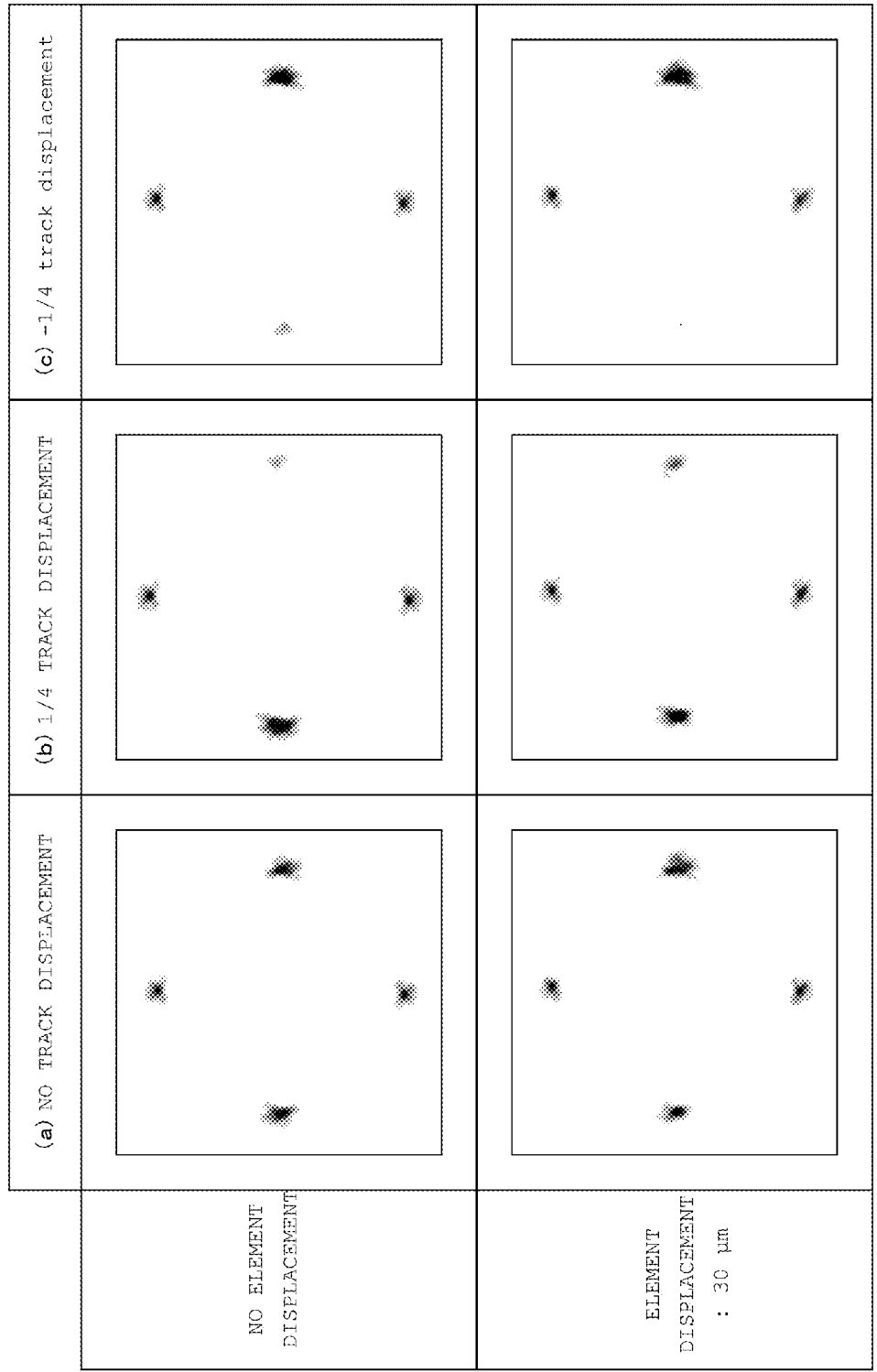
FIG. 13 is a diagram showing simulation results obtained by simulating a light amount balance of signal light, in the case where the position of the angle adjuster is displaced.

FIG. 13 is a diagram showing simulation results obtained by simulating the intensities of signal light in the case where the position of the angle adjuster 17 is displaced, and in the case where the position of the angle adjuster 17 is not displaced. The upper row in FIG. 13 shows simulation results on the intensities of signal light, in the case where the beam spot on a disc is positioned on a track center, and in the case where the beam spot is displaced in the disc radial direction from the track center, in a state that there is no positional displacement of the angle adjuster 17. The lower row in FIG. 13 shows simulation results on the intensities of signal light, in the case where the beam spot on a disc is positioned on a track center, and in the case where the beam spot is displaced in the disc radial direction from the track center, in a state that there is a positional displacement of the angle adjuster 17. In FIG. 12A, the direction of a track groove in a disc is aligned with Z-axis direction, and the positional displacement of the angle adjuster 17 is set to 30 µm in positive Y-axis direction.

The indication "¼ track displacement" means that the beam spot is displaced in the outer circumferential direction of a disc from the track center by a distance corresponding to ¼ of the track pitch, and the indication "-¼ track displacement" means that the beam spot is displaced in the inner circumferential direction of a disc from the track center by a distance corresponding to ¼ of the track pitch. The indication "no track displacement" means that there is no displacement (detrack) of the beam spot with respect to the track center.

Referring to the upper row in FIG. 13, the intensities of left and right two signal light out of four signal light are equal to each other in a state that the beam spot is positioned on the track center. If the beam spot is displaced in the outer circumferential direction and the inner circumferential direction of a disc from the track center, an intensity difference is generated between the left and right two signal light depending on a displacement direction. Accordingly, in the case where there is no positional displacement of the angle adjuster 17, it is possible to properly obtain a push-pull signal (a tracking error signal) by obtaining an intensity difference between left and right two signal light, based on output signals from the sensing portions for receiving the left and right two signal light.

On the other hand, referring to the simulation result in the left end portion in the lower row in FIG. 13, an intensity difference is generated between left and right two signal light, despite that the beam spot is positioned on the track center. Specifically, in this case, the intensity of right signal light is larger than the intensity of left signal light. Further, in the simulation result in the middle portion in the lower row in FIG. 13, the intensity difference between right signal light and left signal light is small, as compared with the simulation result in the middle portion in the upper row. Conversely, in the simulation result in the right end portion in the lower row in FIG. 13, the intensity difference between right signal light and left signal light is large, as compared with the simulation result in the right end portion in the upper row. Thus, in the case where there is a positional displacement of the angle adjuster 17, the intensities of left and right signal light are imbalanced. As a result, even if an intensity difference between left and right two signal light is obtained based on output signals from the sensing portions for receiving the left and right two signal light, it is impossible to properly obtain a push-pull signal (a tracking error signal). Specifically, in this case, a DC component resulting from a positional displacement of the angle adjuster 17 is superimposed on a push-pull signal.

Next, observing upper and lower two signal light out of the four signal light shown in FIG. 13, the intensities of upper and lower two signal light in the transverse direction are equal to each other, without depending on the presence or absence of a detrack, in the three simulation results in the upper row in FIG. 13. On the other hand, in the three simulation results in the lower row in FIG. 13, distortion is generated in upper and lower two signal light, without depending on the presence or absence of a detrack. Because of the distortion, the intensities of the upper and lower two signal light in the transverse direction are imbalanced. Specifically, in this example, the intensities of upper and lower two signal light are deviated in the rightward direction in all of the cases.

The above simulation result clearly shows that the intensities of left and right two signal light are deviated in the leftward direction or the rightward direction, and the intensities of upper and lower two signal light in the transverse direction are deviated in the leftward direction or the rightward direction, in the case where there is a positional displacement of the angle adjuster 17. In view of the above, if an intensity ratio between left and right two signal light is obtained, and an intensity ratio between upper and lower two signal light in the transverse direction is obtained, in the case where there is a positional displacement of the angle adjuster, it is possible to properly obtain a push-pull signal (a tracking error signal), based on the two intensity ratios, in the similar manner as in the case where there is no positional displacement of the angle adjuster.

In view of the above, the inventors of the present application defined the following arithmetic expression capable of suppressing a DC component included in a push-pull signal (a tracking error signal), in the case where the position of the angle adjuster 17 is displaced in a direction perpendicular to the direction of a track image of reflection light on a disc.

Referring to FIG. 11C, let us assume that detection signals to be outputted from the respective sensing portions are A through H shown in FIG. 11C. Assuming that detection signals A through H, in the case where laser light is irradiated onto a mirror surface disc having no track on a recording layer, are A0 through H0, and $D0+E0=SP1$, $A0+H0=SP2$, $B0+G0=SP3$, and $C0+F0=SP4$, respectively, a correction factor α indicating an intensity difference between upper and lower two signal light in the transverse direction, and a correction factor β indicating an intensity difference between left and right two signal light are calculated by the following equations (3) and (4).

$$\alpha = SP4/SP3 = (C0+F0)/(B0+G0) \quad (3)$$

$$\beta = SP2/SP1 = (A0+H0)/(D0+E0) \quad (4)$$

Next, let us assume that detection signals A through H, in the case where tracking servo control is performed with respect to an ordinary disc having a track on a recording layer, are A1 through H1, and D1+E1=PP1R, A1+H1=PP1L, B1+G1=PP2R, and C1+F1=PP2L, respectively. In this case, a signal PP1 relating to an intensity difference between left and right two signal light, and a signal PP2 relating to an intensity difference between upper and lower two signal light in the transverse direction are calculated by the following equations (5) and (6) by correcting intensity balances using the correction factors α and β obtained by the equations (3) and (4).

$$PP1 = \beta \cdot PP1R - PP1L = \beta(D1+E1) - (A1+H1) \quad (5)$$

$$PP2 = \alpha \cdot PP2R - PP2L = \alpha(B1+G1) - (C1+F1) \quad (6)$$

In this case, a tracking error signal TE is obtained by the following equation (7).

$$TE = PP1 - PP2 \quad (7)$$

A conventional push-pull signal (a tracking error signal) obtained by the equation (2) corresponds to the tracking error signal TE obtained by the equation (7), wherein the values of α and β are respectively set to 1 in the equations (5) and (6) (in other words, correction by using the correction factors α and β is not performed).

Next, the inventors obtained the signals PP1 and PP2 expressed by the equations (5) and (6) by simulation, and investigated whether or not it is possible to suppress a DC component included in a push-pull signal (a tracking error signal). The simulation condition is the same as described above.

Figure 14:
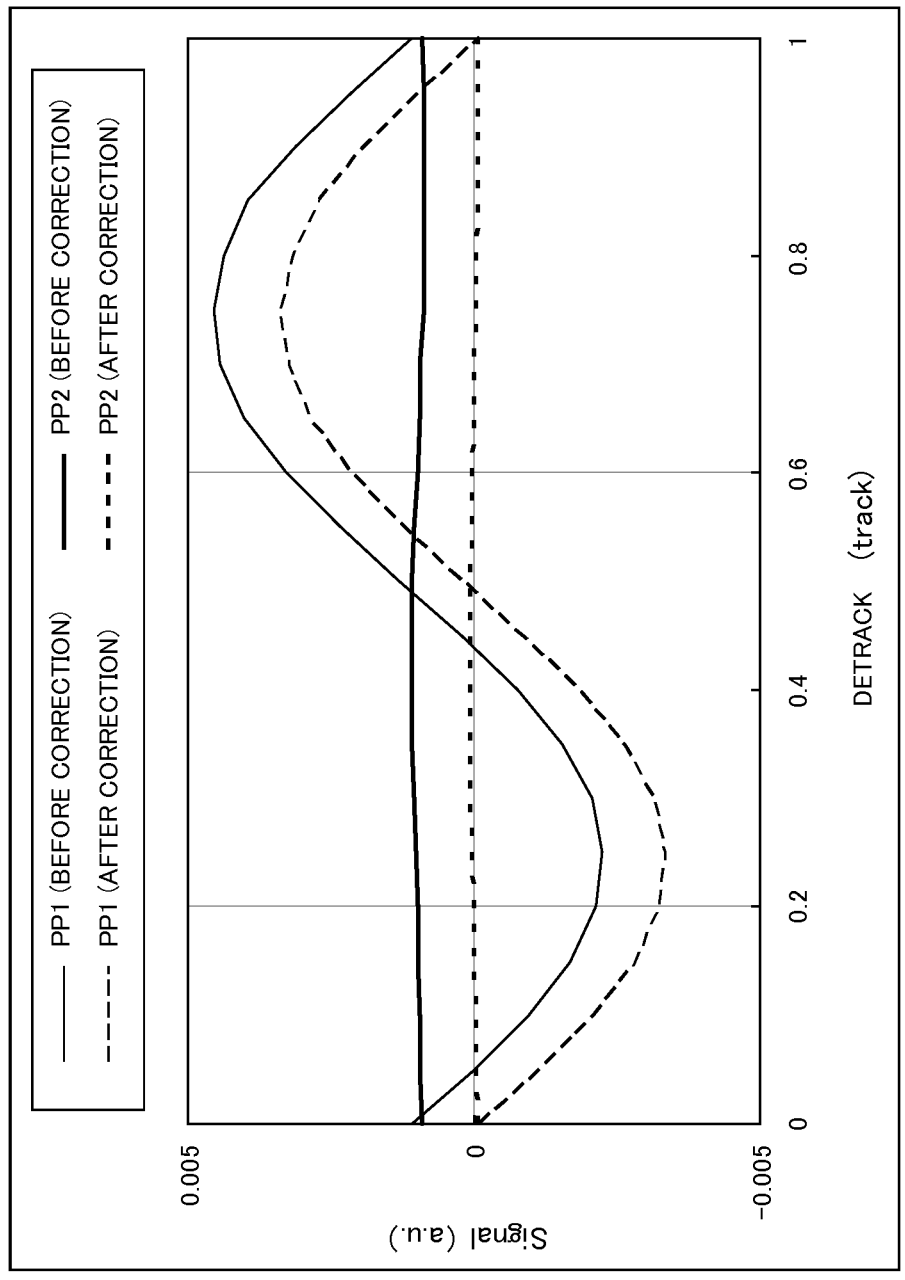
FIG. 14 is a diagram showing a simulation result obtained by simulating states of signals PP1 and PP2, in the case where the position of the angle adjuster is adjusted.

FIG. 14 is a diagram showing a simulation result.

FIG. 14 shows a simulation result, wherein changes in the signals PP1 and PP2 are obtained by changing a detrack amount. In FIG. 14, the axis of abscissas indicates a detrack amount, in the case where the track pitch is set to 1. In FIG. 14, the indication "before correction" means a conventional computation method, in other words, a case that correction by using the correction factors α and β is not performed (which is equivalent to a case: α=1, β=1 in the equations (5) and (6)); and the indication "after correction" means a case that the signals PP1 and PP2 are corrected by using the correction factors α and β obtained by the equations (3) and (4).

As shown in FIG. 14, a DC component is superimposed on the signals PP1 and PP2 before correction, and the graphs of the signals PP1 and PP2 are shifted in the upward direction. This coincides with the simulation result shown in the lower row in FIG. 13. Specifically, the intensities of left and right two signal light are deviated in the rightward direction, and the intensities of upper and lower two signal light in the transverse direction are deviated in the rightward direction, resulting from a positional displacement of the angle adjuster.

On the other hand, as shown in FIG. 14, it is obvious that a DC component is not superimposed on the signals PP1 and PP2 after correction, and the detection signals PP1 and PP2 become substantially zero when the detrack amount becomes zero. Accordingly, it is obvious that a DC component is not superimposed on the tracking error signal TE to be generated by the equation (7), as well as the signals PP1 and PP2 after correction, and the signal value of the tracking error signal TE also becomes substantially zero when the detrack amount becomes zero.

As is obvious from the above simulation results, it is possible to effectively suppress an offset (a DC component) in a push-pull signal (a tracking error signal) by implementing the equations (3) through (7), without depending on the presence or absence of a positional displacement of the angle adjuster. Accordingly, by applying the computations expressed by the equations (3) through (7), in addition to the basic principle described referring to FIGS. 1A through 10D, it is possible to generate a high-quality signal free of an influence of stray light, and effectively suppress an offset (a DC component) in a push-pull signal (a tracking error signal).

Example

In this section, an example of the invention based on the above principle is described.

FIG. 15 is a diagram showing an optical system in an optical pickup device as an example of the invention. In FIG. 15, a relevant circuit configuration is also shown for convenience of description. A disc in FIG. 15 is formed by laminating plural recording layers.

As shown in FIG. 15, the optical system of the optical pickup device includes a semiconductor laser 101, a polarized beam splitter 102, a collimator lens 103, a lens actuator 104, a rise-up mirror 105, a quarter wavelength plate 106, an aperture 107, an objective lens 108, a holder 109, an objective lens actuator 110, a detection lens 111, an angle adjuster 112, and a photodetector 113.

The semiconductor laser 101 emits laser light of a predetermined wavelength. The divergence angle of laser light to be emitted from the semiconductor laser 101 is different between the divergence angle in horizontal direction and the divergence angle in vertical direction, in the similar manner as in the above simulation.

The polarized beam splitter 102 substantially totally reflects laser light (S-polarized light) to be entered from the semiconductor laser 101, and substantially totally transmits laser light (P-polarized light) to be entered from the collimator lens 103. The collimator lens 103 converts laser light to be entered from the polarized beam splitter 102 into parallel light.

The lens actuator 104 displaces the collimator lens 103 in an optical axis direction in accordance with a servo signal to be inputted from a servo circuit 203. Accordingly, aberration in the laser light is corrected. The rise-up mirror 105 reflects the laser light entered from the collimator lens 103 in a direction toward the objective lens 108.

The quarter wavelength plate 106 converts laser light directed to the disc into circularly polarized light, and converts reflection light from the disc into linearly polarized light orthogonal to a polarization direction toward the disc. Accordingly, the laser light reflected on the disc is transmitted through the polarized beam splitter 102.

As similar as in FIG. 12A, the aperture 107 adjusts the beam shape of laser light into a circular shape to properly set the effective diameter of laser light with respect to the objective lens 108. The objective lens 108 is so designed as to properly converge laser light onto a targeted recording layer in the disc. The holder 109 integrally holds the quarter wavelength plate 106 and the objective lens 108. The objective lens actuator 110 is constituted of a conventional well-known electromagnetic drive circuit. A coil portion such as a focus coil of the electromagnetic drive circuit is mounted on the holder 109.

The detection lens 111 imparts astigmatism to reflection light from the disc. Specifically, the detection lens 111 corresponds to the astigmatism element shown in FIG. 1A. The detection lens 111 is disposed at such a position that the flat surface direction and the curved surface direction are each inclined with respect to a track image from the disc by 45 degrees.

The angular adjuster 112 changes the propagating direction of laser light entered from the detection lens 111 in the manner described referring to FIG. 9A. Specifically, the angular adjuster 112 changes propagating directions of light fluxes passing the light flux areas A through D in FIG. 9A, out of the laser light entered into the angular adjuster 112, into the directions Da through Dd by the predetermined angle amount $\alpha$. The angle amount $\alpha$ is so defined that the distribution state of signal light, stray light 1, and stray light 2 on the plane S0 coincides with the distribution shown in FIG. 9B.

The photodetector 113 has the sensing portion as shown in FIG. 10D. The photodetector 113 is disposed in such a manner that the sensing portion is positioned at the position of the plane S0 in FIG. 1A. The photodetector 113 is provided with the eight sensing portions P11 through P18 or eight sensing portions shown in FIG. 10D. These sensing portions P11 through P18 respectively receive light fluxes passing the light flux areas "a" through "h" in FIG. 10D.

A signal computing circuit 201 performs computation with respect to detection signals outputted from the eight sensing portions of the photodetector 113 in the manner as described referring to FIG. 10D, and generates a focus error signal. Further, the signal computing circuit 201 sums up the detection signals outputted from the eight sensing portions, and generates a reproduction RF signal. Furthermore, the signal computing circuit 201 performs computation with respect to the detection signals outputted from the eight sensing portions of the photodetector 113, based on the correction factors $\alpha$ and $\beta$ set by a controller 204, in accordance with the equations (5) through (7), and generates a push-pull signal (a tracking error signal). The focus error signal and the push-pull signal are transmitted to a servo circuit 203, and the reproduction RF signal is transmitted to a reproduction circuit 202 and the servo circuit 203. As will be described later, the signal computing circuit 201 generates correction factors $\alpha$ and $\beta$ in accordance with the equations (3) and (4), and outputs the correction factors $\alpha$ and $\beta$ to the controller 204.

The reproducing circuit 202 demodulates the reproduction RF signal inputted from the signal computing circuit 201, and generates reproduction data. The servo circuit 203 generates a focus servo signal and a tracking servo signal based on the focus error signal and the push-pull signal (the tracking error signal) inputted from the signal computing circuit 201, and outputs the tracking servo signal and the focus servo signal to the objective lens actuator 110. The servo circuit 203 also outputs a servo signal to the lens actuator 104 to optimize the quality of the reproduction RF signal inputted from the signal computing circuit 201.

The controller 204 controls the respective parts in accordance with a program stored in an internal memory. Further, the controller 204 is internally provided with a memory 204a for storing control parameters. The memory 204a stores the correction factors $\alpha$ and $\beta$ generated by the signal computing circuit 201. The correction factors $\alpha$ and $\beta$ stored in the memory 204a are set in the signal computing circuit 201. The signal computing circuit 201 generates a push-pull signal in accordance with the equations (5) and (6) by using the set correction factors $\alpha$ and $\beta$.

Figure 16C:
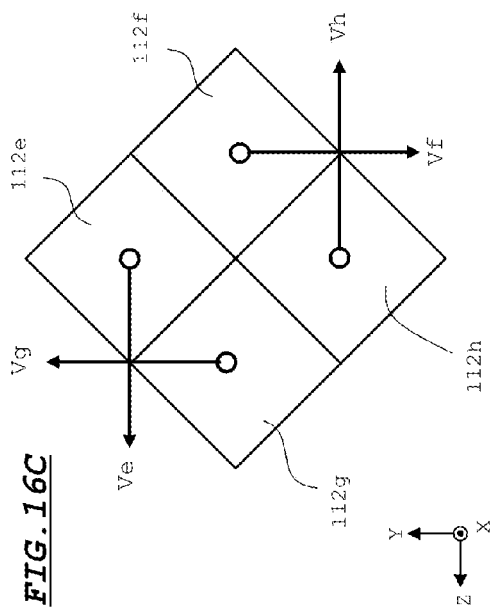
FIGS. 16A through 16C are diagrams showing an arrangement example of an angle adjuster in the inventive example.
Figure 16B:
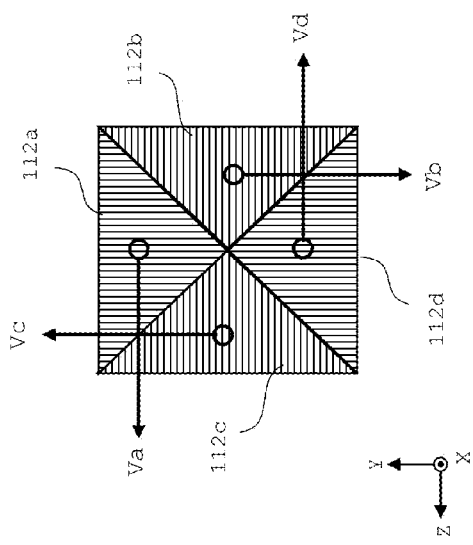
Figure 16A:
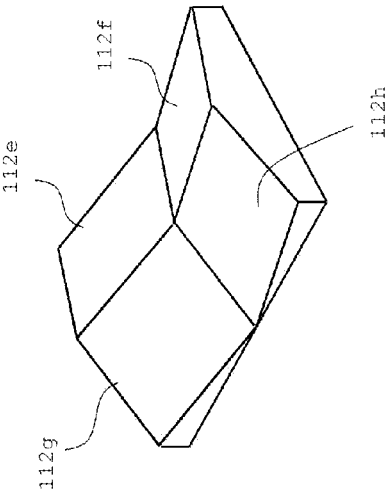

FIGS. 16A through 16C are diagrams showing arrangement examples of the angle adjuster 112. FIG. 16A shows an arrangement example, wherein the angle adjuster 112 is constituted of a hologram element having a diffraction pattern, and FIGS. 16B and 16C show an arrangement example, wherein the angle adjuster 112 is constituted of a polygonal prism.

In the arrangement example shown in FIG. 16A, the angle adjuster 112 is made of a transparent plate substantially having a square shape in plan view, and a hologram pattern is formed on a light incident surface of the angle adjuster 112. As shown in FIG. 16A, the light incident surface is divided into four hologram areas 112a through 112d. The angle adjuster 112 is disposed at a position posterior to the detection lens 111 so that laser light (signal light, stray light 1, and stray light 2) that has passed the light flux areas A through D shown in FIG. 9A is allowed to be entered into the hologram areas 112a through 112d, respectively.

The hologram areas 112a through 112d diffract the incident laser light (signal light, stray light 1, and stray light 2) in directions Va through Vd, respectively. The directions Va through Vd are aligned with the directions Da through Dd shown in FIG. 9A. Accordingly, the hologram areas 112a through 112d change the propagating directions of laser light (signal light, stray light 1, and stray light 2) entered from the detection lens 111 into the directions Da through Dd shown in FIG. 9A, respectively, by diffraction. The diffraction angles with respect to the hologram areas 112a through 112d are identical to each other.

In this example, the diffraction angles are so adjusted as to distribute the laser light (signal light, stray light 1, and stray light 2) that has passed the hologram areas 112a through 112d in the state as shown in FIG. 9B on the plane S0 in FIG. 1A. Accordingly, as described above, disposing the light receiving surface of the photodetector 113 having the sensing portions shown in FIG. 10D on the plane S0 enables to properly receive the corresponding signal light by the eight sensing portions.

The diffraction efficiencies of the hologram areas 112a through 112d are made identical to each other. In the case where a hologram to be formed on the hologram areas 112a through 112d has a stepped pattern, the diffraction efficiency is adjusted depending on the number of steps and the height per step of the hologram pattern, and the diffraction angle is adjusted depending on the pitch of the hologram pattern. In this example, the number of steps and the height per step of the hologram pattern are so determined that the diffraction efficiency of a predetermined diffraction order is set to an intended value. Further, the pitch of the hologram pattern is so adjusted that the distribution as shown in FIG. 9B is given by the diffraction angle corresponding to the diffraction order.

It is noted that the hologram formed in the hologram areas 112a to 112d can also be of a blaze type. The modification is advantageous in increasing the diffraction efficiency, as compared with a case that a stepped pattern is formed on a hologram.

In the arrangement example shown in FIG. 16B, the angle adjuster 112 is made of a transparent member, wherein a light exit surface is flat, and a light incident surface has four areas inclined in different directions from each other. FIG. 16C is a diagram of the angle adjuster 112 shown in FIG. 16B, viewed from the side of the light incident surface. As shown in FIG. 16C, the light incident surface of the angle adjuster 112 has four tilted surfaces 112e through 112h. When light rays are entered into the tilted surfaces 112e through 112h from the side of the light incident surface in parallel to X-axis, the propagating directions of the incident light are respectively changed into directions Ve through Vh shown in FIG. 15C by refraction of the incident light into the tilted surfaces 112e through 112*h*. In this example, the refraction angles with respect to the tilted surfaces 112*e* through 112*h* are identical to each other.

The angle adjuster 112 shown in FIG. 16B is disposed at a position posterior to the detection lens 111 so that laser light (signal light, stray light 1, and stray light 2) that has passed the light flux areas A through D shown in FIG. 9A is entered into the tilted surfaces 112*e* through 112*h*, respectively. Disposing the angle adjuster 112 in the above manner enables to make the refraction directions Ve through Vh with respect to the tilted surfaces 112*e* through 112*h* coincide with the direction Da through Dd shown in FIG. 9A. Accordingly, the tilted surfaces 112*e* through 112*h* change the propagating directions of laser light (signal light, stray light 1, and stray light 2) entered from the detection lens 111 into the directions Da through Dd shown in FIG. 9A by a predetermined angle, by refraction.

In this example, the refraction angles with respect to the tilted surfaces 112*e* through 112*h* are so adjusted as to distribute the laser light (signal light, stray light 1, and stray light 2) that has passed the tilted surfaces 112*e* through 112*h* in the state as shown in FIG. 9B on the plane S0 in FIG. 1A. Accordingly, disposing the photodetector 113 having the sensing portions shown in FIG. 10D on the plane S0 enables to properly receive the corresponding signal light by the eight sensing portions. Since the refraction function has significantly small wavelength dependence, as compared with the diffraction function, the arrangement using the refraction function has a higher compatibility with respect to a wavelength change of a light source, or a multiple wavelength light source.

In the arrangement example shown in FIG. 16A, the hologram areas 112*a* through 112*d* are provided only with the angle-changing diffraction function of changing the propagating direction of laser light by a predetermined angle. Alternatively, a hologram pattern of imparting astigmatism by the detection lens 111 simultaneously with the angle changing function may be formed on the hologram areas 112*a* through 112*d*. Further alternatively, a hologram pattern having an angle changing function may be formed on the light incident surface of the angle adjuster 112, and a hologram pattern having astigmatism function may be formed on the light exit surface of the angle adjuster 112. Similarly to the above, in the angle adjuster 112 shown in FIG. 16B, a lens surface for imparting astigmatism may be formed on the light exit surface of the angle adjuster 112; or the tilted surfaces 112*e* through 112*h* may be formed into a curved surface shape so that the tilted surfaces 112*e* through 112*h* are provided with a lens function of imparting astigmatism. The modification enables to eliminate the detection lens 111 to thereby reduce the number of parts and the cost.

Figure 17:
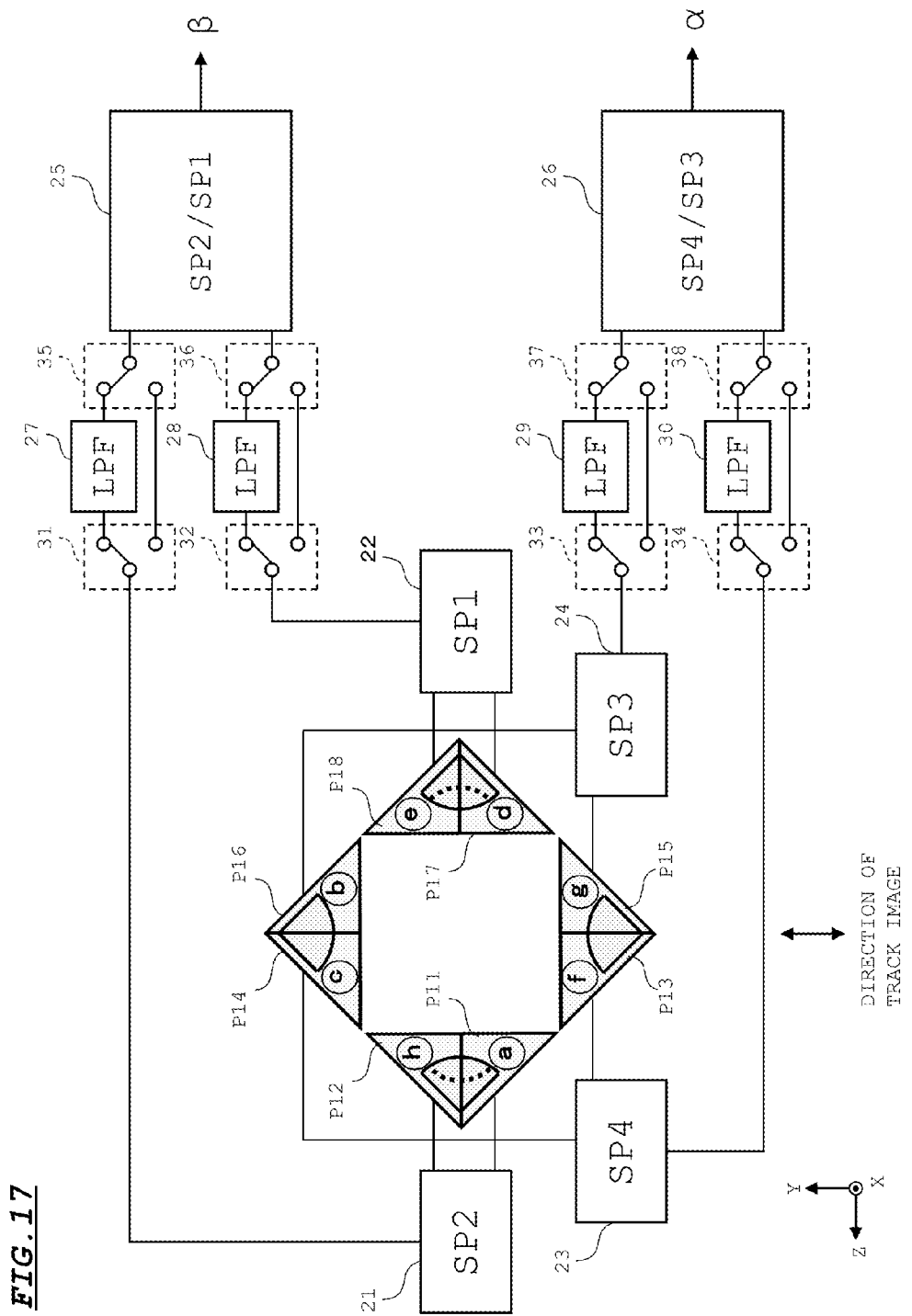
FIG. 17 is a diagram showing a configuration of a computation processor in the inventive example.

FIG. 17 is a diagram showing a configuration of a computation processor, in the signal computing circuit 201, for generating the correction factors α and β by the equations (3) and (4). As shown in FIG. 17, the computation processor for generating correction factors α and β includes adder circuits 21 through 24, divider circuits 25 and 26, LPFs (low-pass filters) 27 through 30, and switches 31 through 38.

The adder circuit 21 sums up output signals from the sensing portions P11 and P12, and outputs a signal SP2 in accordance with the light amount of left signal light. The adder circuit 22 sums up output signals from the sensing portions P17 and P18, and outputs a signal SP1 in accordance with the light amount of right signal light. The adder circuit 23 sums up output signals from the sensing portions P13 and P14, and outputs a signal SP4 in accordance with the light amount of left half portions of upper and lower two signal light. The adder circuit 24 sums up output signals from the sensing portions P15 and P16, and outputs a signal SP3 in accordance with the light amount of right half portions of the upper and lower two signal light.

The switches 31 through 38 are connected to respective corresponding upper or lower contact portions in association with an instruction from the controller 204 shown in FIG. 15. By performing the above operation, connection is switched between the connection in the case where the LPFs 27 through 30 disposed between the switches are used, and the connection in the case where the LPFs 27 through 30 are not used. The switching operation is determined depending on the kind of a disc to be used in obtaining correction factors α and β. Specifically, in the case where an ordinary disc having a track groove is used, the switches 31 through 38 are connected to the respective corresponding upper contact portions, and the LPFs 27 through 30 are used. In the case where a test disc (a mirror surface disc) having no track groove is used, the switches 31 through 38 are connected to the respective corresponding lower contact portions, and the LPFs 27 through 30 are not used.

In the case where the switches 31 through 38 are connected to the respective corresponding upper contact portions, the LPFs 27 through 30 respectively output, to a posterior circuit, direct current components whose high frequency components of the signals SP2, SP1, SP3, and SP4 to be outputted from the adder circuits 21, 22, 23, and 24 are cut off. Specifically, the LPFs 27 through 30 cut off, from the signals SP1 through SP4, a high frequency noise component which may be generated when a beam spot crosses a track groove during rotation of a disc; and outputs signals corresponding to direct current components of the signals SP1 through SP4 to the posterior circuit. In this arrangement, even if an ordinary disc is used in obtaining correction factors α and β, the switches 31 through 38 are connected to the respective corresponding upper contact portions to allow use of the LPFs 27 through 30, whereby signals with no or less influence resulting from a track groove are supplied to the divider circuits 25 and 26, and the correction factor α and β obtained in a condition analogous to a condition that a test disc (a mirror surface disc) is used.

In the case where a test disc is used in obtaining correction factors α and β, there is no likelihood that a high frequency noise component resulting from a track groove may be generated. Accordingly, the switches 31 through 38 are connected to the respective corresponding lower contact portions, and the signals SP1 through SP4 are supplied to the divider circuits 25 and 26 with no processing.

The divider circuit 25 divides the output signals from the switches 35 and 36 to thereby generate a correction factor β based on a light amount ratio between left and right two signal light. The divider circuit 26 divides the output signals from the switches 37 and 38 to thereby generate a correction factor α based on a light amount ratio between upper and lower two signal light in the transverse direction.

In obtaining correction factors α and β, firstly, the position of the objective lens 108 is aligned in the optical axis direction to set a focus error signal to zero, and thereafter, the correction factors α and β are obtained by the computation processor shown in FIG. 17.

In this embodiment, correction factors α and β are obtained by using a test disc at the time of producing an optical disc device, and the correction factors α and β are stored in the memory 204*a* for storing control parameters in the controller 204. In performing the above operation, the switches 31 through 38 shown in FIG. 17 are respectively connected to the lower contact portions, and the computations expressed by the equations (3) and (4) are performed by the divider circuits 25 and 26. At the time of start of use of the optical disc device, a tracking error signal TE is generated based on the equations (5) through (7) by using the correction factors α and β stored in the memory.

Further, after start of use of the optical disc device, for instance, every time a predetermined time elapses, correction factors α and β are obtained by using an ordinary disc, and the correction factors to be used in generating a push-pull signal (a tracking error signal) are updated. In performing the above operation, the switches 31 through 38 in FIG. 17 are respectively connected to the upper contact portions, and the computations expressed by the equations (3) and (4) are performed by the divider circuits 25 and 26, based on the signals SP1 through SP4 whose high frequency components are cut off by the LPFs 27 through 30. In obtaining the correction factors α and β by using an ordinary disc as described above, only the focus servo control is turned on to converge laser light on a predetermined recording layer, and the tracking servo control is turned off.

Figure 18:
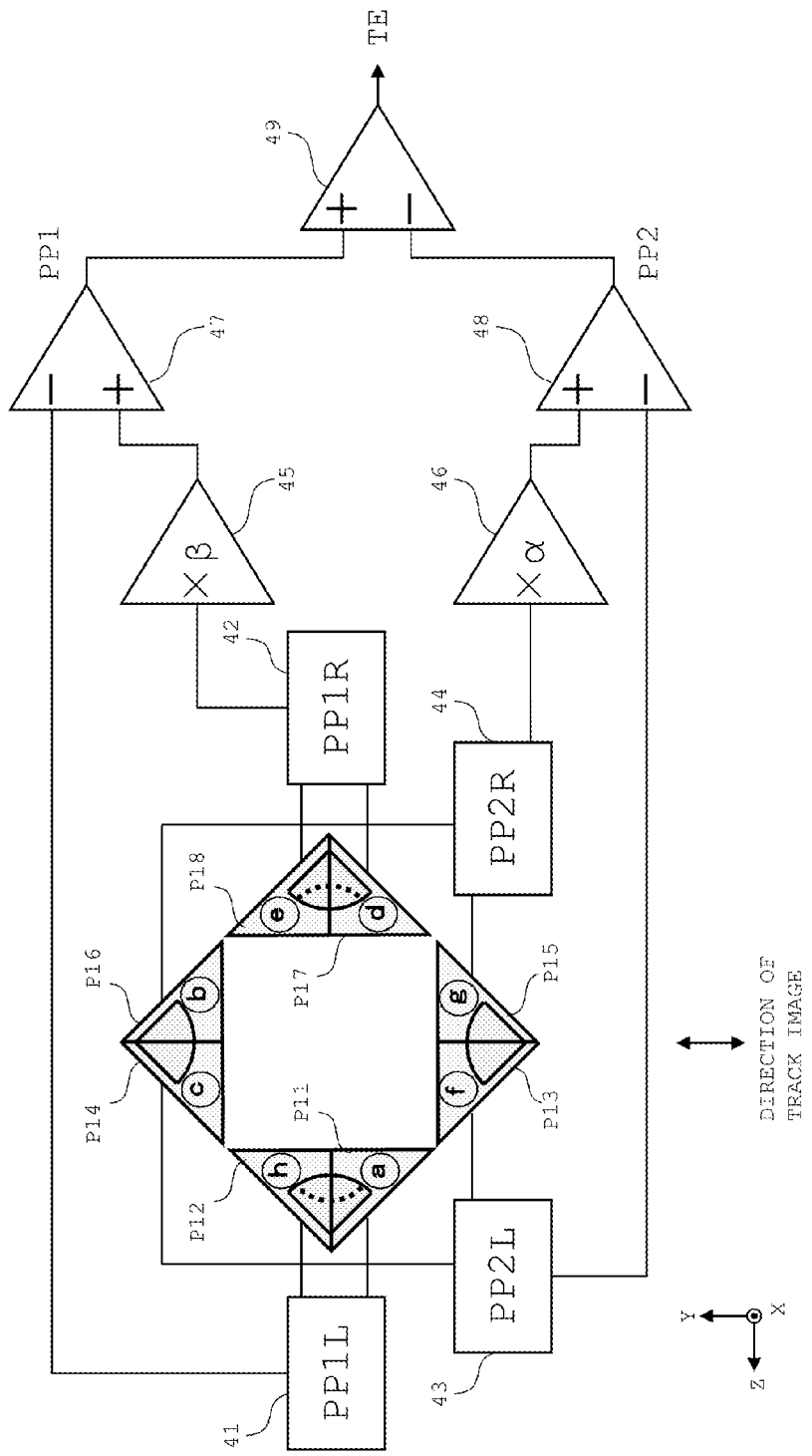
FIG. 18 is a diagram showing another configuration of the computation processor in the inventive example.

FIG. 18 is a diagram showing a configuration of the computation processor, in the signal computing circuit 201, for generating a push-pull signal (a tracking error signal) by the equations (5) through (7). As shown in FIG. 18, the computation processor for generating a push-pull signal (a tracking error signal) includes adder circuits 41 through 44, multiplication circuits 45 and 46, and subtractor circuits 47, 48, and 49.

The adder circuit 41 sums up output signals from the sensing portions P11 and P12, and outputs a signal PP1L in accordance with the light amount of left signal light. The adder circuit 42 sums up output signals from the sensing portions P17 and P18, and outputs a signal PP1R in accordance with the light amount of right signal light. The adder circuit 43 sums up output signals from the sensing portions P13 and P14, and outputs a signal PP2L in accordance with the light amount of left half portions of upper and lower two signal light. The adder circuit 44 sums up output signals from the sensing portions P15 and P16, and outputs a signal PP2R in accordance with the light amount of right half portions of the upper and lower two signal light.

The adder circuits 41 through 44 shown in FIG. 18 may be constituted of the same adder circuits as the adder circuits 21 through 24 shown in FIG. 17 to sum up output signals from the same sensing portions to be used by the adder circuits 21 through 24 shown in FIG. 17.

The multiplication circuit 45 outputs a signal obtained by multiplying the signal PP1R to be outputted from the adder circuit 42 with the correction factor β to the subtractor circuit 47. The multiplication circuit 46 outputs a signal obtained by multiplying the signal PP2R to be outputted from the adder circuit 44 with the correction factor α to the subtractor circuit 48.

The correction factors α and β to be used in the multiplication circuits 45 and 46 are adjusted by the controller 204. Specifically, at the time of start of use of an optical disc device, correction factors α and β are acquired by using a test disc as described above, and the correction factors α and β stored in the memory 204a are respectively set in the multiplication circuits 46 and 45. Further, every time a predetermined time elapses from start of use of the optical disc device, correction factors α and β are acquired by using an ordinary disc, and the acquired correction factors α and β are respectively set in the multiplication circuits 46 and 45.

The subtractor circuit 47 calculates a difference between the output signals from the adder circuit 41 and the multiplication circuit 45 to thereby generate the signal PP1 based on left and right two signal light. The subtractor circuit 48 calculates a difference between the output signals from the adder circuit 43 and the multiplication circuit 46 to thereby generate the signal PP2 based on upper and lower two signal light. The subtractor circuit 49 calculates a difference between the output signals from the subtractor circuits 47 and 48, and outputs a signal obtained by the subtraction as a tracking error signal TE.

The signal computing circuit 201 shown in FIG. 15 may be disposed in the optical pickup device or in the optical disc device. Further alternatively, a part of a circuit section constituting the signal computing circuit 201 may be disposed in the optical pickup device. For instance, the entirety of the computing section shown in FIGS. 17 and 18 may be disposed in the optical pickup device or in the optical disc device. Further alternatively, the computation processor may be divided into two circuit sections, and the two circuit sections may be disposed in the optical pickup device and in the optical disc device individually by e.g. disposing one of the circuit sections for generating the correction factors α and β, or the signals PP1 and PP2 in the optical pickup device, and disposing the circuits posterior to the one circuit section in the optical disc device.

In this embodiment, the correction factors α and β obtained by the computation processor shown in FIG. 17 by using a test disc are stored in the memory 204a in the controller 204 in the optical disc device. Alternatively, the correction factors α and β may be stored in e.g. a memory disposed in the optical pickup device, or a memory integrally formed with the photodetector 113.

As described above, in the foregoing example, there is no likelihood that signal light reflected on a targeted recording layer of the recording layers formed in a disc, and stray light 1 and stray light 2 reflected on a recording layer on and under the targeted recording layer may be superimposed one over the other on the light receiving surface (the plane S0 where the spot of signal light becomes a least circle of confusion in an on-focus state) of the photodetector 113. Specifically, the distribution of signal light, stray light 1, and stray light 2 on the light receiving surface (plane S0) can be made in the state as shown in FIG. 9B. Thus, disposing the sensing portions P11 through P18 shown in FIG. 10D on the signal light area shown in FIG. 9B enables to receive only the corresponding signal light on the sensing portions P11 through P18. This enables to suppress deterioration of a detection signal resulting from stray light.

In addition to the above, in the inventive example, correction factors α and β are generated by the circuit configuration shown in FIG. 17, and a push-pull signal (a tracking error signal) is generated by the circuit configuration shown in FIG. 18. Accordingly, as described based on the simulation results, an offset (a DC component) included in a push-pull signal (a tracking error signal) resulting from a positional displacement of the angle adjuster 112 can be effectively suppressed.

Further, the above advantages can be attained by merely disposing the angle adjuster 112 on an optical path of laser light reflected on a disc, in other words, between the detection lens 111 and the photodetector 113 in the arrangement shown in FIG. 15. Accordingly, the inventive example is advantageous in effectively removing an influence by stray light with a simplified arrangement, and suppressing an offset (a DC component) included in a push-pull signal (a tracking error signal) resulting from a positional displacement of the angle adjuster 112.

Figure 19:
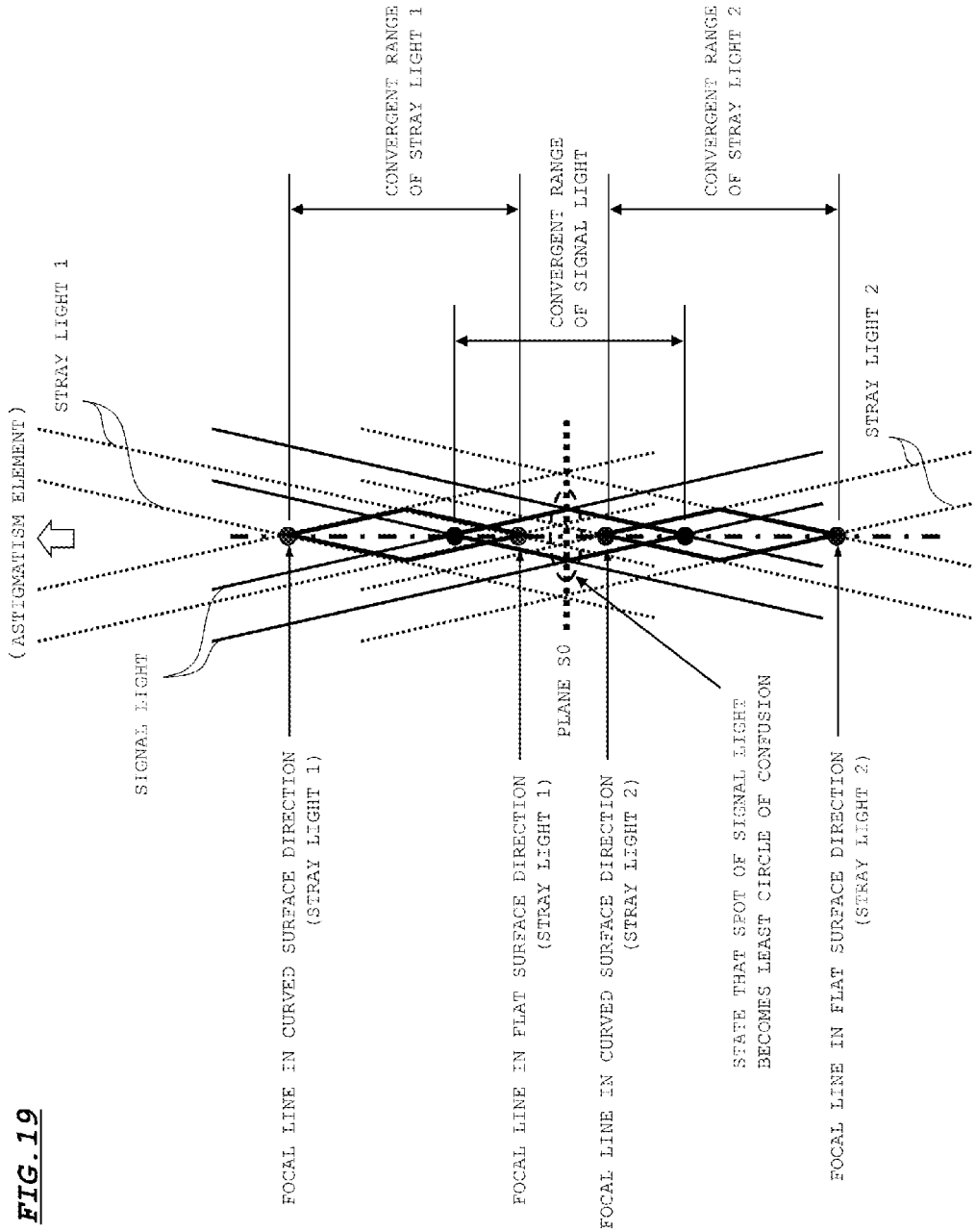
FIG. 19 is a diagram showing the inventive example, and a preferred application range of the technical principle of the invention.

The effect of removing stray light based on the above principle is obtained, as shown in FIG. 19, when the focal line position of stray light 1 in the flat surface direction is closer to the astigmatism element with respect to the plane S0 (a plane where the beam spot of signal light becomes a least circle of confusion), and the focal line position of stray light 2 in the curved surface direction is away from the astigmatism element with respect to the plane S0. Specifically, as far as the above relation is satisfied, the distribution of signal light, stray light 1, and stray light 2 can be made in the states as shown in FIGS. 8A through 8D, which enables to avoid a likelihood that signal light, stray light 1, and stray light 2 may be superimposed one over the other on the plane S0. In other words, as far as the above relation is satisfied, even if the focal line position of stray light 1 in the flat surface direction is moved closer to the plane S0 than the focal line position of signal light in the curved surface direction, or even if the focal line position of stray light 2 in the curved surface direction is moved closer to the plane S0 than the focal line position of signal light in the flat surface direction, the effect of the invention and the example based on the above principle can be obtained.

Acquisition of correction factors α and β by the computation processor shown in FIG. 17 is required to be performed in a condition that installation of an optical system is completed, in other words, in a condition that the positions of the angle adjuster 112 and the photodetector 113 are adjusted (determined). The position adjustments are performed by e.g. the following method.

Figure 20:
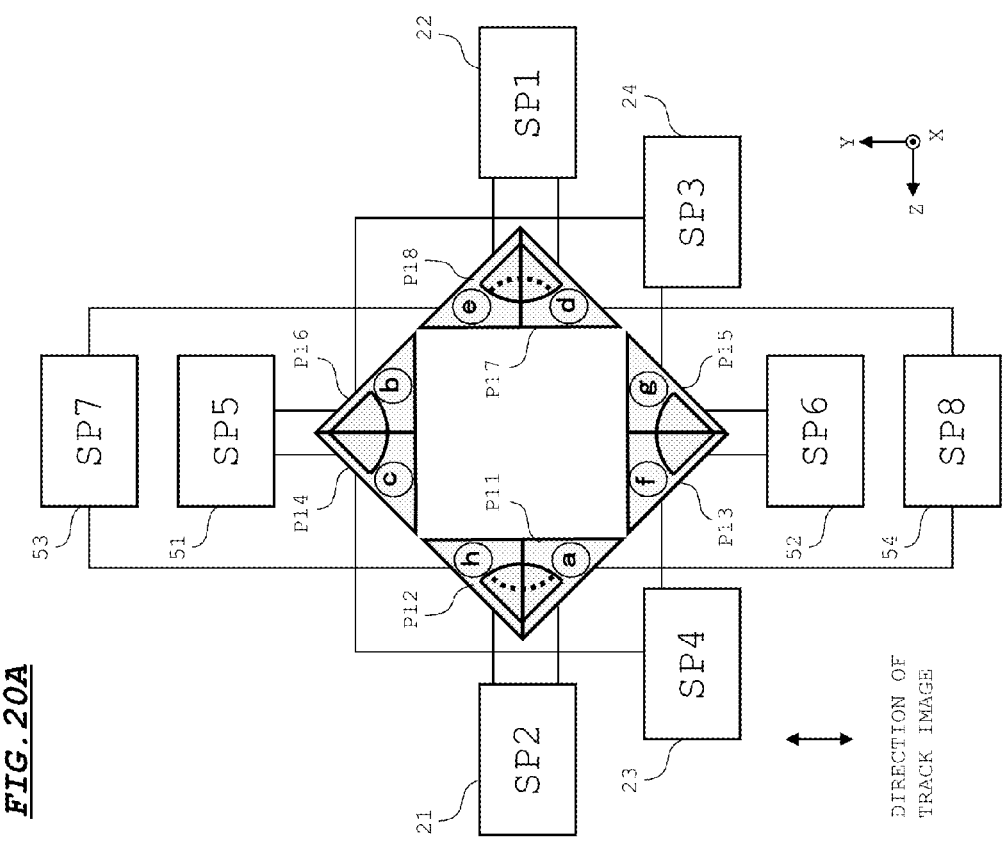
FIGS. 20A through 20C are diagrams for describing position adjustments of an angle adjuster and a photodetector in the inventive example.

FIG. 20A is a diagram showing a partial configuration of the computation processor for performing position adjustments of the angle adjuster 112 and the photodetector 113. As shown in FIG. 20A, the computation processor for performing position adjustments includes adder circuits 51 through 54, in addition to the adder circuits 21 through 24 shown in FIG. 17. Illustration of the circuits posterior to the adder circuits 21 through 24, and 51 through 54 is omitted to simplify the description.

The adder circuit 51 sums up output signals from the sensing portions P14 and P16, and outputs a signal SP5 in accordance with the light amount of upper signal light. The adder circuit 52 sums up output signals from the sensing portions P13 and P15, and outputs a signal SP6 in accordance with the light amount of lower signal light. The adder circuit 53 sums up output signals from the sensing portions P12 and P18, and outputs a signal SP7 in accordance with the light amount of upper half portions of left and right two signal light. The adder circuit 54 sums up output signals from the sensing portions P11 and P17, and outputs a signal SP8 in accordance with the light amount of lower half portions of the left and right two signal light.

Firstly, the position adjustment of the angle adjuster 112 is described.

FIG. 20B is a diagram showing that the position of the angle adjuster 112 is displaced in negative Y-axis direction. The light amounts of signal light passing the four areas i.e. the upper area, the right area, the left area, and the lower area of the angle adjuster 112 respectively correspond to the signals SP2, SP6, SP5, and SP1 to be outputted from the adder circuits 21, 52, 51, and 22 shown in FIG. 20A.

As shown in FIG. 20B, if the position of the angle adjuster 112 is displaced in the downward direction, the signal value of the signal SP2 is increased, and the signal value of the signal SP1 is decreased. In view of the above, the direction in which the angle adjuster 112 is displaced can be determined by comparing the signal SP1 and the signal SP2 in the case where the position of the angle adjuster 112 is displaced in the upward direction or the downward direction, and comparing the signal SP5 and the signal SP6 in the case where the position of the angle adjuster 112 is displaced in the leftward direction or the rightward direction.

Accordingly, M1 representing a positional displacement of the angle adjuster 112 in negative Y-axis direction, and N1 representing a positional displacement of the angle adjuster 112 in positive Z-axis direction are calculated by the following equations (8) and (9).

$$M1=(SP2-SP1)/(SP2+SP1) \quad (8)$$

$$N1=(SP6-SP5)/(SP6+SP5) \quad (9)$$

The position adjustment of the angle adjuster 112 is performed to set M1 and N1 to zero, respectively.

Next, the position adjustment of the photodetector 113 is described.

FIG. 20C is a diagram showing that the position of the photodetector 113 is displaced in positive Z-axis direction. As shown in FIG. 20C, if the photodetector 113 is displaced in the leftward direction, the sum of light amounts of signal light to be entered into the sensing portions P11, P12, P15, and P16 is increased, and the sum of light amounts of signal light to be entered into the sensing portions P13, P14, P17, and P18 is decreased. At this time, the sum of the signal SP2 and the signal SP3 is increased, and the sum of the signal SP1 and the signal SP4 is decreased. In view of the above, leftward/rightward displacement of the photodetector 113 can be determined by comparing a summation value of the signal SP2 and the signal SP3, and a summation value of the signal SP1 and the signal SP4 in the case where the position of the photodetector 113 is displaced in the leftward direction or the rightward direction. Likewise, upward/downward displacement of the photodetector 113 can be determined by comparing a summation value of the signal SP6 and the signal SP7, and a summation value of the signal SP5 and the signal SP8 in the case where the position of the photodetector 113 is displaced in the upward direction or the downward direction.

Accordingly, M2 representing a positional displacement of the photodetector 113 in positive Z-axis direction, and N2 representing a positional displacement of the photodetector 113 in negative Y-axis direction are calculated by the following equations (10) and (11).

$$M2=\{(SP2+SP3)-(SP1+SP4)\}/\{(SP2+SP3)+(SP1+SP4)\} \quad (10)$$

$$N2=\{(SP6+SP7)-(SP5+SP8)\}/\{(SP6+SP7)+(SP5+SP8)\} \quad (11)$$

The position adjustment of the photodetector 113 is performed to set M2 and N2 to zero, respectively.

The position adjustments of the angle adjuster 112 and the photodetectors 113 are concurrently performed to set the values of the equations (8) through (11) to zero, respectively.

In the foregoing, an inventive example and a modification of the inventive example have been described. The invention is not limited to the inventive example and the modification of the inventive example, and the embodiment of the invention may be modified in various ways other than the above.

For instance, in the embodiment, correction factors α and β are acquired by using a test disc having no track at the time of producing an optical disc device. Alternatively, correction factors α and β may be acquired by using the test disc by a test device at the time of producing an optical pickup device, and the acquired correction factors α and β may be held in a memory in the optical pickup device.

Figure 21:
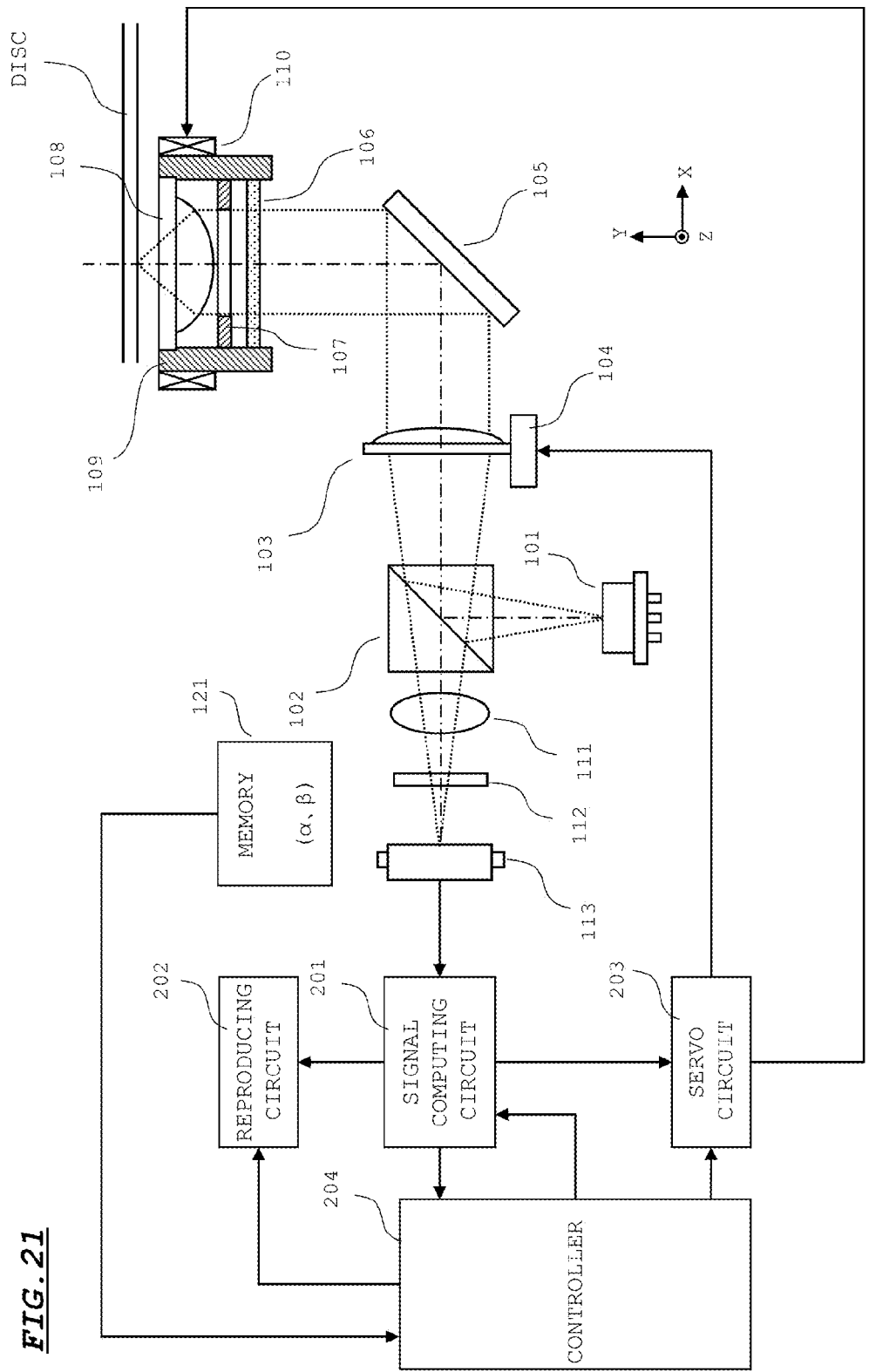
FIG. 21 is a diagram showing arrangements of an optical system in an optical pickup device, and an optical disc device as a modification example.

FIG. 21 is a diagram showing an arrangement of an optical disc device in the above modification. In the arrangement of the modification, a memory 121 disposed in an optical pickup device 100 holds correction factors α and β. As described above, the correction factors α and β are acquired by performing the computations expressed by the equations (3) and (4) by a test device with use of a test disc having no track at the time of producing an optical pickup device.

In this arrangement, correction factors α and β are acquired by using a test disc having no track. Alternatively, correction factors α and β may be acquired by using a test disc having a track or an ordinary disc, and the acquired correction factors α and β may be held in the memory 121 at the time of producing the optical pickup device 100. In this case, the test device has a circuit configuration as shown in FIG. 17. In the case where a test disc having no track is used, the switches 31 through 38 are connected to the respective corresponding lower contact portions, and correction factors α and β are obtained. In the case where a test disc having a track or an ordinary disc is used, the switches 31 through 38 are connected to the respective corresponding upper contact portions, and correction factors α and β are obtained. The acquired correction factors α and β are held in the memory 121 in the optical pickup device 100.

The computation and the acquisition of correction factors α and β as described above are performed after the position adjustment of an optical system is completed. Specifically, after the position of the angle adjuster 112 is adjusted at the time of e.g. installing an optical system, correction factors α and β are obtained to suppress a DC component in a push-pull signal (a tracking error signal) resulting from slight positional displacement of the angle adjuster 112, based on the aforementioned principle.

The controller 204 is incorporated in the optical pickup device 100. Thereafter, upon receiving an electric power supply, the controller 204 reads out the correction factors α and β from the memory 121 in the optical pickup device 100, and sets the readout correction factors α and β in the multiplication circuits 45 and 46 shown in FIG. 18. Thus, at the time of start of use of the optical disc device, a tracking error signal TE is generated based on the correction factors α and β stored in the memory 121.

Similarly to the embodiment, after start of use of an optical disc device, for instance, every time a predetermined time elapses, correction factors α and β are acquired by using an ordinary disc, and the acquired correction factors α and β are set in the multiplication circuits 45 and 46. By performing the above operation, even if the position of the angle adjuster 112 is displaced resulting from e.g. aging deterioration after installation of the optical system, detection precision of a push-pull signal (a tracking error signal) can be kept high.

In the above arrangement, since acquisition of correction factors α and β using a test disc is performed at the time of producing the optical pickup device 100, there is no need of providing a circuit configuration for acquiring correction factors α and β by using a test disc in an optical disc device. Specifically, the above arrangement enables to omit the switches 31 through 38 shown in FIG. 17, and allows supply of only the signals from the LPFs 27 through 30 to the divider circuits 25 and 26.

In the case where an operation of updating the correction factors α and β by using an ordinary disc is accepted after start of use of the optical disc device, the circuit configuration shown in FIG. 17 is used as it is. In this case, if the correction factors α and β are updated by using a test disc, the switches 31 through 38 are connected to the respective corresponding lower contact portions, and if the correction factors α and β are updated by using an ordinary disc, the switches 31 through 38 are connected to the respective corresponding upper contact portions.

Similarly to the embodiment, in the arrangement shown in FIG. 21, a part of the signal computing circuit 201 may be disposed in the optical pickup device 100.

In the embodiment, a tracking error signal TE is generated by using both of the signal PP1 and the signal PP2 shown in FIG. 18. Alternatively, for instance, as shown in FIG. 22A, the signal PP1 may be directly used as a tracking error signal TE, without using the signal PP2. In the modification, since the correction factor α is not necessary, as shown in FIG. 22B, an arrangement for generating the correction factor α also is omitted. Further, the arrangement for holding the correction factor α is also omitted. As shown in FIG. 14, since a variation of the signal PP2 with respect to track displacement is small, use of the signal PP1 as a tracking error signal enables to obtain a tracking error signal having substantially the same precision as in the embodiment. The above modification is advantageous in simplifying the configuration of the computation processor.

Further, in the arrangement shown in FIG. 18, the signals to be inputted from the adder circuits 42 and 44 are corrected, out of the signals to be inputted to the subtractor circuits 47 and 48. Alternatively, the signals to be inputted from the adder circuits 41 and 43 may be corrected, in place of the signals to be inputted from the adder circuits 42 and 44.

Furthermore, in the embodiment, the eight sensing portions P11 through P18 are formed on the photodetector 113 to generate both of a focus error signal and a tracking error signal. Alternatively, in the case where there is no need of generating a focus error signal based on outputs from the photodetector 113, the sensing portions P11 and P12 may constitute one sensing portion, and the sensing portions P18 and P17 may constitute one sensing portion. In the above modification, a half mirror is disposed between the angle adjuster 112 and the photodetector 113 shown in FIG. 15, and an additional photodetector for receiving a light flux reflected on the half mirror is disposed. Similarly to the embodiment, in the modification, a signal light area as shown in FIG. 9B is formed on the additionally provided photodetector. The additionally provided photodetector may have a sensing portion necessary for computation of a focus error signal.

The embodiment of the invention may be changed or modified in various ways as necessary, as far as such changes and modifications do not depart from the scope of the claims of the invention hereinafter defined.

What is claimed is:

1. An optical pickup device comprising:
a laser light source;
an objective lens which converges laser light emitted from the laser light source on a disc;
an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light;
a spectral element which changes propagating directions of four light fluxes obtained by dividing a light flux of the laser light reflected on the disc by a first straight line and a second straight line respectively in parallel to the first direction and the second direction to disperse the four light fluxes from each other;
a photodetector including a sensor group which receives the four light fluxes dispersed by the spectral element; and
a memory which holds a correction value for suppressing a DC component in a tracking error signal resulting from a positional displacement of the spectral element with respect to an optical axis of the laser light.

2. An optical disc device comprising:
an optical pickup device; a computing circuit which computes a signal to be outputted from the optical pickup device; and
a memory which holds a control parameter, the optical pickup device including:
   a laser light source;
   an objective lens which converges laser light emitted from the laser light source on a disc;
   an astigmatism element which imparts astigmatism to the laser light reflected on the disc to set a first focal line position to be defined by convergence of the laser light in a first direction, and a second focal line position to be defined by convergence of the laser light in a second direction perpendicular to the first direction away from each other in a propagating direction of the laser light;
   a spectral element which changes propagating directions of four light fluxes obtained by dividing a light flux of the laser light reflected on the disc by a first straight line and a second straight line respectively in parallel to the first direction and the second direction to disperse the four light fluxes from each other; and
   a photodetector which receives the four light fluxes dispersed by the spectral element, wherein
   the memory holds a correction value for suppressing a DC component in a tracking error signal resulting from a positional displacement of the spectral element with respect to an optical axis of the laser light, and
   the computing circuit includes a computing section which generates the tracking error signal based on an output from the photodetector, and a correcting section which corrects an output from the computing section based on the correction value.

3. The optical disc device according to claim 2, wherein
the astigmatism element is disposed at such a position that the first direction and the second direction are inclined with respect to a direction of a track image from the disc by 45°,
the computing section includes a first computing section which calculates a light amount balance of two light fluxes out of the four light fluxes, the two light fluxes being in a direction perpendicular to the track image, and
the correcting section includes a first correcting section which corrects an output from the first computing section based on a first correction value held in the memory.

4. The optical disc device according to claim 3, wherein
the computing section includes a second computing section which calculates a light amount balance of two light fluxes out of the four light fluxes in the direction perpendicular to the track image, the two light fluxes being in a direction parallel to the track image, and
the correcting section includes a second correcting section which corrects an output from the second computing section based on a second correction value held in the memory.

5. The optical disc device according to claim 3, wherein
assuming that signals from the photodetector based on the two light fluxes in the direction perpendicular to the track image are respectively a signal SP1 and a signal SP2, the optical disc device further comprises:
a low-pass filter which cuts off high frequency components of the signal SP1 and the signal SP2; and
a correction value computing section which computes a ratio between the signal SP1 and the signal SP2 whose high frequency components are cut off by the low-pass filter to calculate the first correction value.

6. A focus adjusting method for controlling a focal point of irradiated light to follow a track on a target surface, the focus adjusting method comprising:
imparting astigmatism to the irradiated light reflected on the target surface to set a first focal line position to be defined by convergence of the irradiated light in a first direction, and a second focal line position to be defined by convergence of the irradiated light in a second direction perpendicular to the first direction away from each other in a propagating direction of the irradiated light;
changing propagating directions of four light fluxes obtained by dividing a light flux of the irradiated light reflected on the target surface by a first straight line and a second straight line respectively in parallel to the first direction and the second direction to disperse the four light fluxes from each other;
generating a focus error signal by an astigmatism method based on a light amount balance between the four light fluxes to adjust a position of the focal point in an optical axis direction of the irradiated light based on the generated focus error signal;
generating a push-pull signal based on a light amount balance, of the irradiated light reflected on the target surface, in a direction perpendicular to a diffraction image of the track to adjust a position of the focal point in a direction of the irradiated light crossing the track, based on the generated push-pull signal; and
obtaining a correction value for suppressing a DC component in the push-pull signal, based on a light amount balance in a direction perpendicular to the diffraction image, the light amount balance being obtained by converging the irradiated light on a flat reflection surface devoid of formation of the track, before the position of the focal point is adjusted in the direction crossing the track to correct the push-pull signal based on the obtained correction value, and to adjust the position of the focal point in the direction crossing the track, based on the corrected push-pull signal.

* * * * *